US012595023B2

(12) United States Patent
Hasegawa

(10) Patent No.: US 12,595,023 B2
(45) Date of Patent: Apr. 7, 2026

(54) BICYCLE DERAILLEUR AND CHARGING CABLE FOR BICYCLE DERAILLEUR

(71) Applicant: SHIMANO INC., Sakai City (JP)

(72) Inventor: Akihiro Hasegawa, Sakai City (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/434,808

(22) Filed: Feb. 7, 2024

(65) Prior Publication Data

US 2024/0174323 A1 May 30, 2024

Related U.S. Application Data

(63) Continuation of application No. 17/017,692, filed on Sep. 11, 2020, now Pat. No. 11,926,394.

(51) Int. Cl.
| | |
|---|---|
| *B62M 9/06* | (2006.01) |
| *B60L 53/16* | (2019.01) |
| *B60L 53/80* | (2019.01) |
| *B62J 43/13* | (2020.01) |
| *B62J 43/20* | (2020.01) |
| *B62M 6/40* | (2010.01) |

(52) U.S. Cl.
CPC .............. *B62M 9/06* (2013.01); *B60L 53/16* (2019.02); *B60L 53/80* (2019.02); *B62J 43/13* (2020.02); *B62J 43/20* (2020.02); *B62M 6/40* (2013.01); *B60L 2200/12* (2013.01)

(58) Field of Classification Search
CPC .... B62M 9/122; B62M 9/1242; B62M 9/128; B62M 25/08; B62M 9/132; B62M 9/138; B62M 9/137; B62M 9/127; B62J 43/30

USPC ...................................................... 474/80, 82
See application file for complete search history.

(56) References Cited

U.S. PATENT DOCUMENTS

| | | | | |
|---|---|---|---|---|
| 4,946,425 A * | 8/1990 | Buhlmann | ............. | B62M 9/122 |
| | | | | 280/238 |
| 9,106,818 B2 * | 8/2015 | Lai | ......................... | H04N 23/50 |
| 9,676,444 B2 * | 6/2017 | Shipman | ................ | B62M 9/124 |
| 10,086,907 B2 * | 10/2018 | Tachibana | ............ | H04B 1/3827 |
| 10,405,444 B2 * | 9/2019 | Mishima | ................ | B62K 19/40 |
| 11,066,126 B2 * | 7/2021 | Kurokawa | ............. | B62M 25/08 |
| 11,472,509 B2 * | 10/2022 | Sala | ....................... | B62M 9/125 |
| 2005/0239587 A1 * | 10/2005 | Ichida | .................... | B62M 9/132 |
| | | | | 474/82 |
| 2009/0215561 A1 * | 8/2009 | Fukuda | .................. | B62M 9/122 |
| | | | | 474/82 |

(Continued)

FOREIGN PATENT DOCUMENTS

| | | |
|---|---|---|
| CN | 205900846 U | 1/2017 |
| CN | 107571961 | 1/2018 |

OTHER PUBLICATIONS

Office Action with Form PTO-892 Notice of References Cited issued by the U.S. Patent and Trademark Office for the U.S. Appl. No. 17/017,692, Nov. 4, 2022.

(Continued)

*Primary Examiner* — Henry Y Liu

(74) *Attorney, Agent, or Firm* — MORI & WARD, LLP

(57) ABSTRACT

A bicycle derailleur includes a derailleur body and a charging port configured to be detachably coupled to a charging cable to charge an electric power source. The charging port includes an electric terminal. The electric terminal includes a plurality of electric contact surfaces being disposed along a first longitudinal direction of the charging port.

20 Claims, 19 Drawing Sheets

(56) References Cited

U.S. PATENT DOCUMENTS

| 2011/0269586 | A1* | 11/2011 | Numajiri | F16H 7/1263 474/138 |
| 2012/0322591 | A1* | 12/2012 | Kitamura | B62M 9/122 474/80 |
| 2013/0192405 | A1* | 8/2013 | Katsura | B62M 9/105 74/473.12 |
| 2015/0111675 | A1* | 4/2015 | Shipman | B62M 9/122 474/82 |
| 2015/0329161 | A1* | 11/2015 | Fujii | B62J 3/14 701/64 |
| 2016/0093975 | A1* | 3/2016 | Katiyar | H01F 7/0252 439/38 |
| 2016/0152301 | A1* | 6/2016 | Bortoli | B62M 9/132 474/82 |
| 2016/0221640 | A1* | 8/2016 | Watarai | B62M 9/122 |
| 2017/0034937 | A1* | 2/2017 | Mishima | B62M 9/132 |
| 2017/0101162 | A1* | 4/2017 | Tachibana | B62M 25/08 |
| 2017/0113759 | A1* | 4/2017 | Watarai | B62J 43/30 |
| 2017/0120983 | A1* | 5/2017 | Komatsu | B62K 25/30 |
| 2017/0247082 | A1* | 8/2017 | Katsura | B62M 9/132 |
| 2018/0001960 | A1* | 1/2018 | Pasqua | B62M 25/08 |
| 2018/0180640 | A1* | 6/2018 | Miglioranza | G01P 3/488 |
| 2018/0237104 | A1* | 8/2018 | Pasqua | B62M 9/122 |
| 2018/0274623 | A1* | 9/2018 | Brown | F16F 9/10 |
| 2018/0339747 | A1* | 11/2018 | Niki | B62J 43/20 |
| 2018/0354586 | A1* | 12/2018 | Komatsu | B62M 9/1242 |
| 2019/0031290 | A1* | 1/2019 | Kurokawa | B62K 19/36 |
| 2019/0100279 | A1* | 4/2019 | Brown | B62M 9/127 |
| 2019/0100280 | A1* | 4/2019 | Brown | B62M 1/36 |
| 2019/0144071 | A1* | 5/2019 | Boehm | B62M 9/1248 474/80 |
| 2019/0193802 | A1* | 6/2019 | Hara | B62M 25/08 |
| 2019/0351971 | A1* | 11/2019 | Dueweling | B62M 9/122 |
| 2020/0156737 | A1* | 5/2020 | Liao | B62J 43/30 |
| 2020/0262510 | A1* | 8/2020 | Hahn | B62M 6/45 |
| 2020/0269954 | A1* | 8/2020 | Mizutani | B62M 9/128 |
| 2020/0346714 | A1* | 11/2020 | Hahn | B62M 9/122 |
| 2021/0129937 | A1* | 5/2021 | Sala | H02J 7/02 |
| 2021/0129938 | A1* | 5/2021 | Sala | B62M 9/1242 |
| 2021/0129939 | A1* | 5/2021 | Sala | B62M 9/128 |
| 2021/0129940 | A1* | 5/2021 | Sala | B62J 45/413 |
| 2021/0394865 | A1* | 12/2021 | Wesling | B62M 25/08 |

OTHER PUBLICATIONS

Office Action issued by the U.S. Patent and Trademark Office for the U.S. Appl. No. 17/017,692, Mar. 14, 2023.

Office Action issued by the U.S. Patent and Trademark Office for the U.S. Appl. No. 17/017,692, Jun. 22, 2023.

Office Action with Form PTO-892 Notice of References Cited issued by the U.S. Patent and Trademark Office for the U.S. Appl. No. 17/017,692, Aug. 7, 2023.

* cited by examiner

PS

BICYCLE DERAILLEUR AND CHARGING CABLE FOR BICYCLE DERAILLEUR

CROSS-REFERENCE TO RELATED APPLICATIONS

The present application is a continuation application of U.S. patent application Ser. No. 17/017,692 filed Sep. 11, 2020. The contents of U.S. patent application Ser. No. 17/017,692 are incorporated herein by reference in their entirety.

BACKGROUND OF THE INVENTION

Field of the Invention

The present invention relates to a bicycle derailleur and a charging cable for a bicycle derailleur.

Discussion of the Background

A bicycle includes a derailleur configured to move a chain relative to a plurality of sprockets.

SUMMARY OF THE INVENTION

In accordance with a first aspect of the present invention, a bicycle derailleur includes a derailleur body and a charging port configured to be detachably coupled to a charging cable to charge an electric power source. The charging port includes an electric terminal. The electric terminal includes a plurality of electric contact surfaces being disposed along a first longitudinal direction of the charging port.

In accordance with a second aspect of the present invention, a charging cable for a bicycle derailleur includes a charging connector and an electric cable extending from the charging connector. The charging connector includes an external electric terminal. The external electric terminal includes a plurality of external electric contact surfaces being disposed along an extending direction of the electric cable.

In accordance with a third aspect of the present invention, a charging cable for a bicycle derailleur includes a charging connector and an electric cable extending from the charging connector. The charging connector includes an external electric terminal. The external electric terminal includes a plurality of external electric contact surfaces being disposed along a second longitudinal direction of the charging connector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
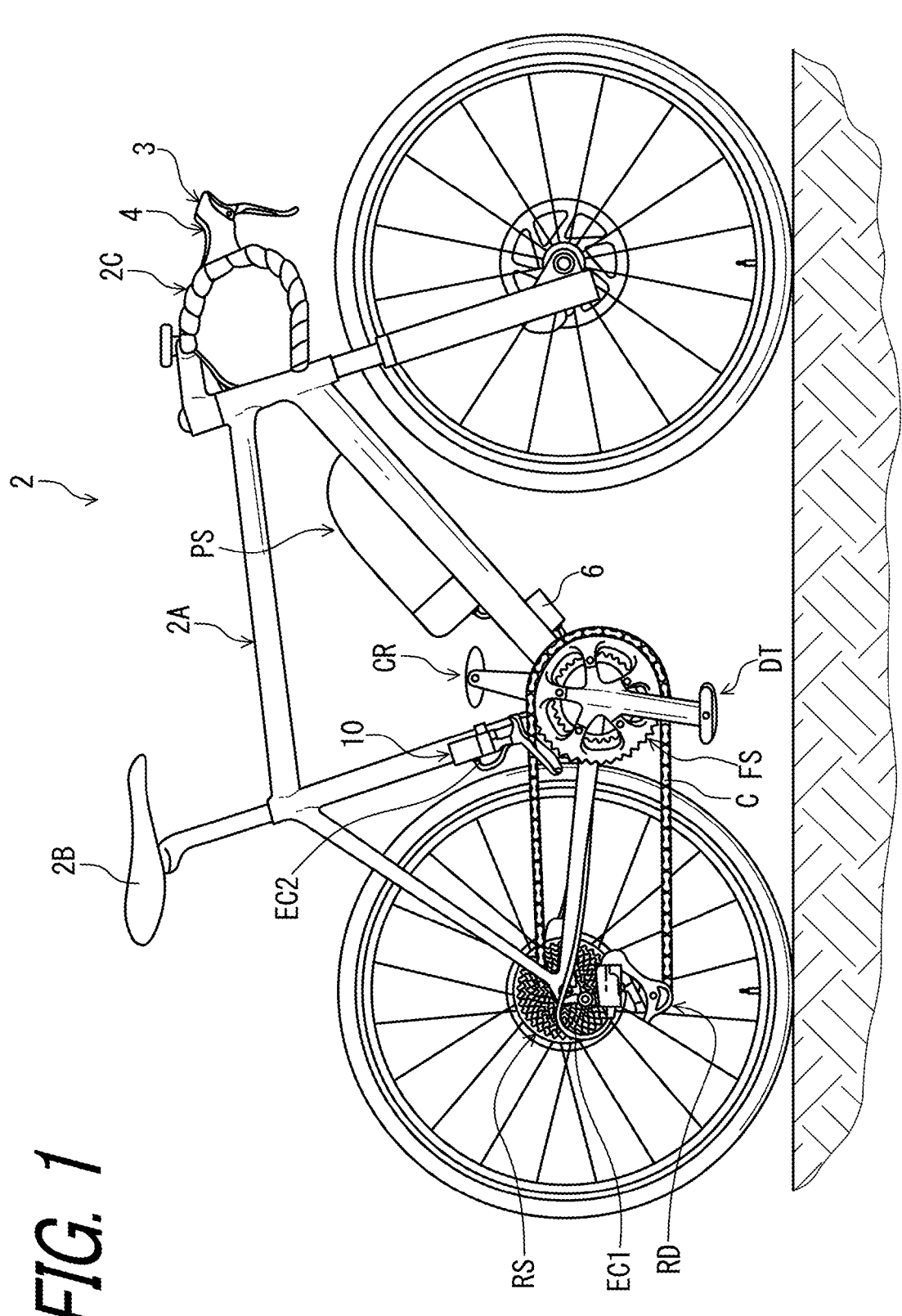
FIG. 1 is a side elevational view of a bicycle including a bicycle derailleur in accordance with an embodiment.
Figure 2:
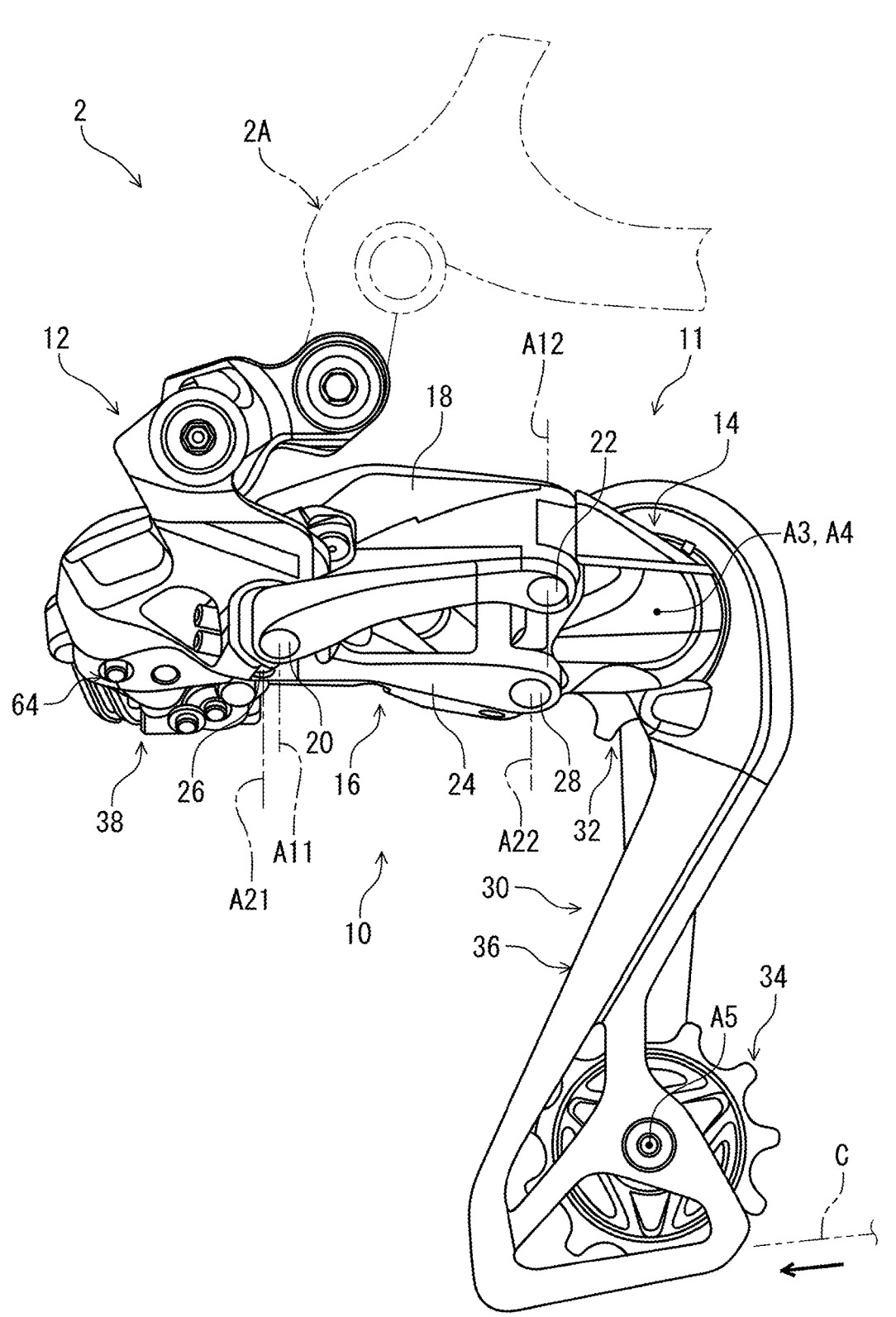
FIG. 2 is a side elevational view of the bicycle derailleur of the bicycle illustrated in FIG. 1.

The embodiment(s) will now be described with reference to the accompanying drawings, wherein like reference numerals designate corresponding or identical elements throughout the various drawings.

Referring initially to FIG. 1, a bicycle derailleur 10 is configured to be mounted to a bicycle frame 2A of a bicycle 2. The bicycle 2 further includes a saddle 2B, a handlebar 2C, an operating device 3, an operating device 4, a drive train DT, and an electric power source PS. The operating devices 3 and 4 are configured to be mounted to the handlebar 2C. The drive train DT includes a crank CR, a front sprocket assembly FS, a rear sprocket assembly RS, a chain C, and a bicycle derailleur FD. The front sprocket assembly FS is secured to the crank CR. The rear sprocket assembly RS is rotatably mounted to the bicycle frame 2A. The chain C is engaged with the front sprocket assembly FS and the rear sprocket assembly RS.

The bicycle derailleur 10 is mounted to the bicycle frame 2A and is configured to shift the chain C relative to a plurality of sprockets of the rear sprocket assembly RS to change a gear position. The bicycle derailleur FD is configured to shift the chain C relative to a plurality of sprockets of the front sprocket assembly FS.

The electric power source PS is configured to supply electricity to at least one of the operating device 3, the operating device 4, the bicycle derailleur 10, and the bicycle derailleur FD. In the present embodiment, the electric power source PS is configured to supply electricity to the operating device 3, the operating device 4, the bicycle derailleur 10, and the bicycle derailleur FD. However, the electric power source PS can be configured to supply electricity to components (e.g., an assist drive unit, an adjustable seatpost, a suspension) other than the above components. The electric power source PS is configured to be mounted to the bicycle frame 2A. In the first embodiment, the electric power source PS is configured to be mounted on a down tube of the bicycle frame 2A. However, the electric power source PS can be configured to be mounted to other parts of the bicycle frame 2A such as a seat tube. The electric power source PS can be configured to be directly mounted to other devices such as the bicycle derailleur 10 or FD.

The bicycle 2 includes a road bike. However, the bicycle 2 can include a mountain bike, a city bike, a tricycle, a cargo bike, a recumbent bike, or any type of bicycles. In the present embodiment, the bicycle derailleur 10 is a rear derailleur. However, the structure of the bicycle derailleur 10 can apply to other derailleurs such as the front derailleur FD.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the bicycle with facing a handlebar. Accordingly, these terms, as utilized to describe the bicycle derailleur 10 or other components, should be interpreted relative to the bicycle 2 equipped with the bicycle derailleur 10 as used in an upright riding position on a horizontal surface.

The bicycle derailleur 10 comprises a derailleur body 11. The derailleur body 11 includes a base member 12 and a movable member 14. Namely, the bicycle derailleur 10 further comprises the base member 12 and the movable member 14. The base member 12 is configured to be mounted to the bicycle frame 2A. The movable member 14 is configured to be movably coupled to the base member 12.

The derailleur body 11 includes a linkage structure 16. Namely, the bicycle derailleur 10 comprises the linkage structure 16. The linkage structure 16 is configured to movably couple the movable member 14 to the base member 12. The linkage structure 16 includes at least one linkage axis.

In the present embodiment, the linkage structure 16 includes a first link 18, a first link pin 20, a first additional link pin 22, a second link 24, a second link pin 26, and a second additional link pin 28. The first link 18 is pivotally coupled to the base member 12 about a first linkage axis A11 with the first link pin 20. The second link 24 is pivotally coupled to the base member 12 about a second linkage axis A21 with the second link pin 26. The first link 18 is pivotally coupled to the movable member 14 about a first additional linkage axis A12 with the first additional link pin 22. The second link 24 is pivotally coupled to the movable member 14 about a second additional linkage axis A22 with the second additional link pin 28.

Figure 3:
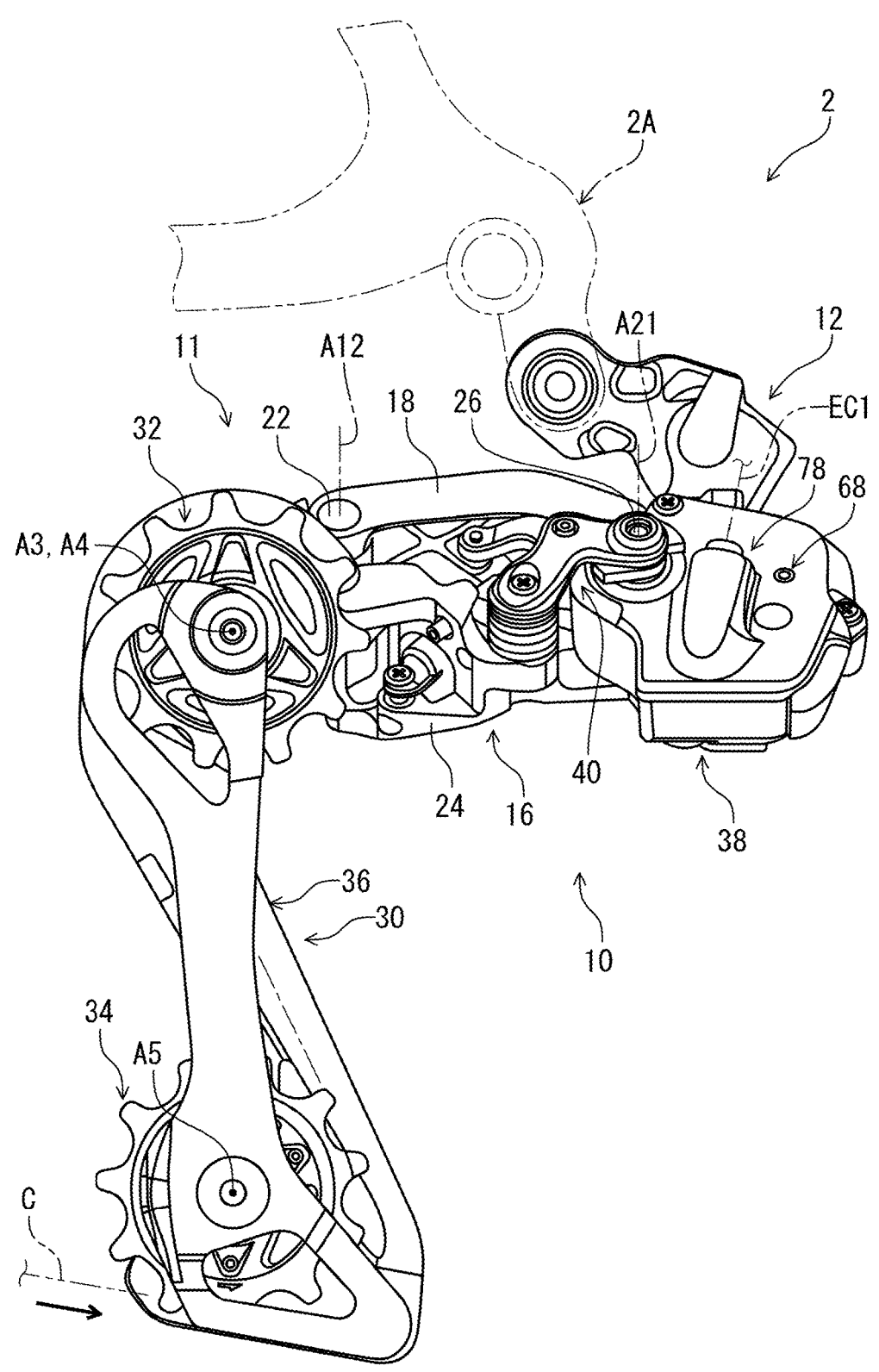
FIG. 3 is another side elevational view of the bicycle derailleur illustrated in FIG. 2.

As seen in FIG. 3, the derailleur body 11 includes a chain guide 30. Namely, the bicycle derailleur 10 comprises the chain guide 30. The chain guide 30 is pivotally disposed on the movable member 14. The chain guide 30 is pivotable relative to the movable member 14 about a chain-guide axis A3. The chain guide 30 includes a guide pulley 32, a tension pulley 34, and a guide member 36. The guide member 36 is pivotally coupled to the movable member 14 about the chain-guide axis A3. The guide pulley 32 is rotatably coupled to the guide member 36 about a guide pulley axis A4. The tension pulley 34 is rotatably coupled to the guide member 36 about a tension pulley axis A5. The guide pulley 32 and the tension pulley 34 are configured to be engaged with a chain C.

The derailleur body 11 includes a motor unit 38. Namely, the bicycle derailleur 10 further comprises the motor unit 38. The motor unit 38 is configured to be coupled to at least one of the movable member 14 and the linkage structure 16 to move the movable member 14 relative to the base member 12. In the present embodiment, the motor unit 38 is configured to be coupled to the second link 24 of the linkage structure 16 to move the movable member 14 relative to the base member 12. However, the motor unit 38 can be configured to be coupled to the movable member 14 or both the movable member 14 and the linkage structure 16 to move the movable member 14 relative to the base member 12.

The bicycle derailleur 10 comprises a saver structure 40 configured to protect the motor unit 38 from overload. The motor unit 38 is configured to be coupled to the second link 24 of the linkage structure 16 via the saver structure 40. The saver structure 40 has a transmission state and a non-transmission state. In the transmission state, the saver structure 40 is configured to transmit a drive force of the motor unit 38 to the linkage structure 16 to move the movable member 14 with respect to the base member 12. In the non-transmission state, the saver structure 40 is configured to shut off the transmission of the drive force from the motor unit 38 to the linkage structure 16. Since the saver structure 40 includes a structure which has been known in the bicycle field, it will not be described in detail here for the sake of brevity.

Figure 4:
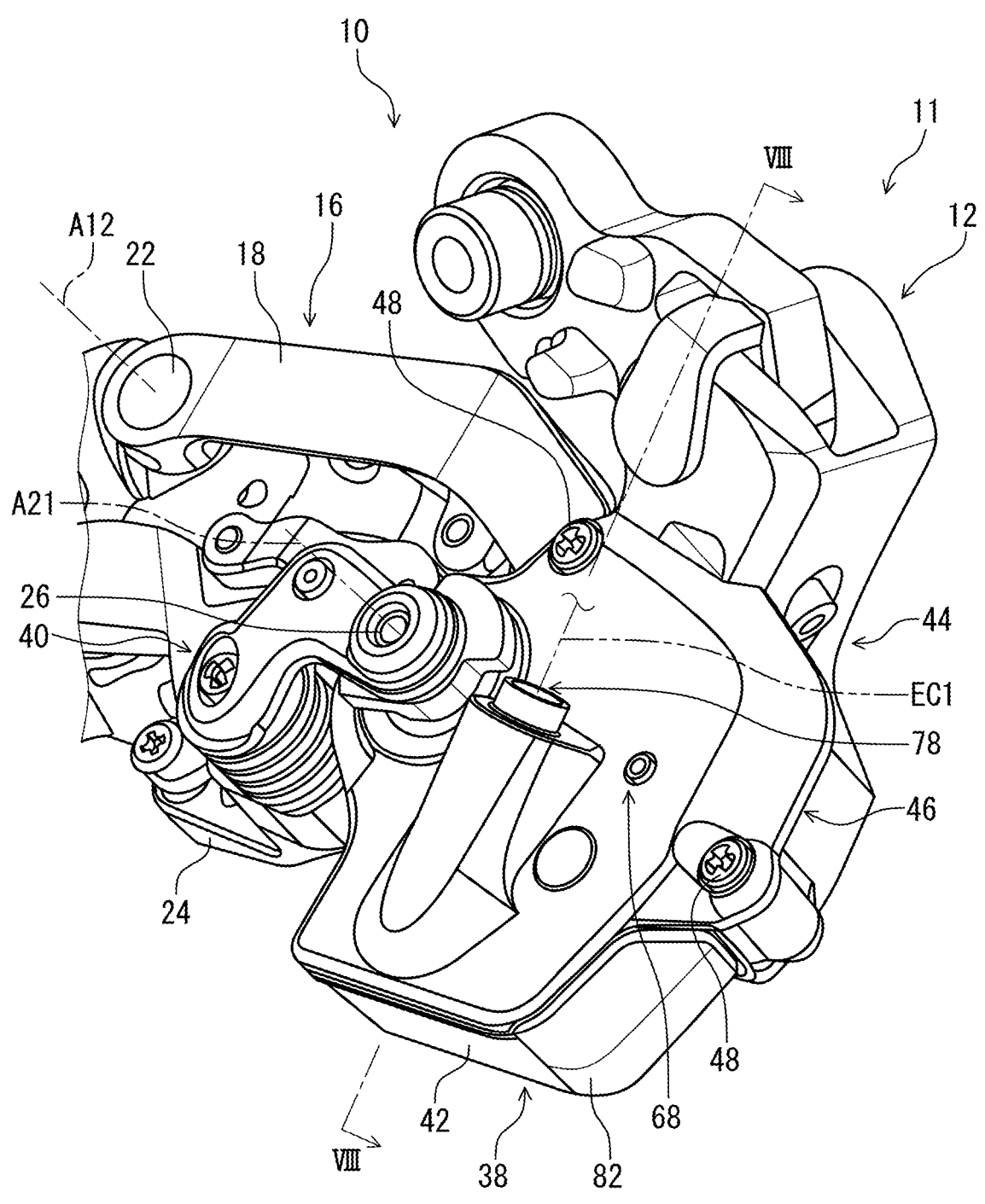
FIG. 4 is a perspective view of the bicycle derailleur illustrated in FIG. 2.
Figure 5:
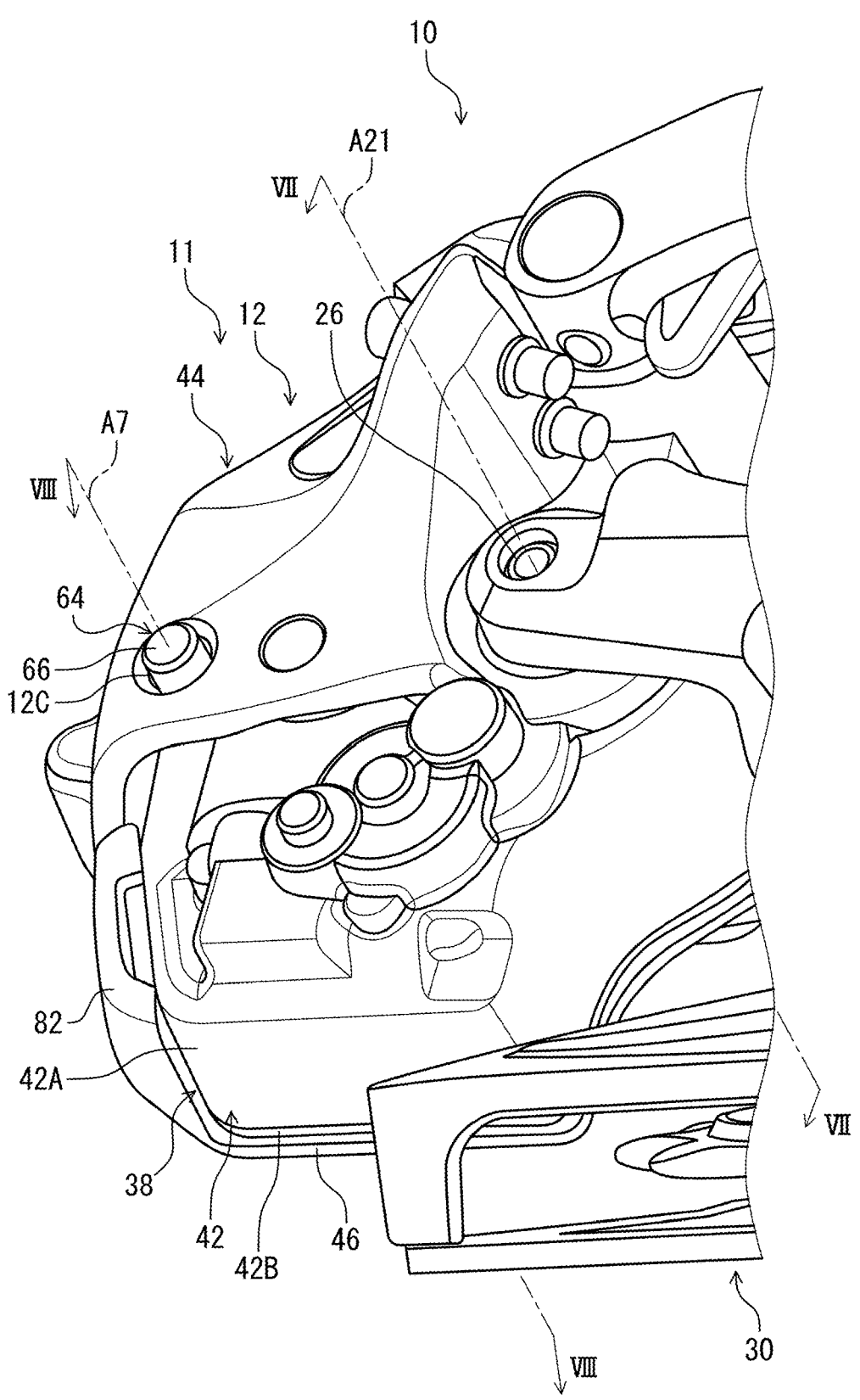
FIG. 5 is another perspective view of the bicycle derailleur illustrated in FIG. 2.

As seen in FIGS. 3 and 4, the motor unit 38 includes a housing 42. The housing 42 is configured to be attached to the base member 12. The base member 12 includes a first base member 44 and a second base member 46. The second base member 46 is a separate member from the first base member 44. The second base member 46 is configured to be detachably attached to the first base member 44. As seen in FIG. 4, the second base member 46 is secured to the first base member 44 with a plurality of fasteners 48 such as screws. The housing 42 is held between the first base member 44 and the second base member 46.

Figure 6:
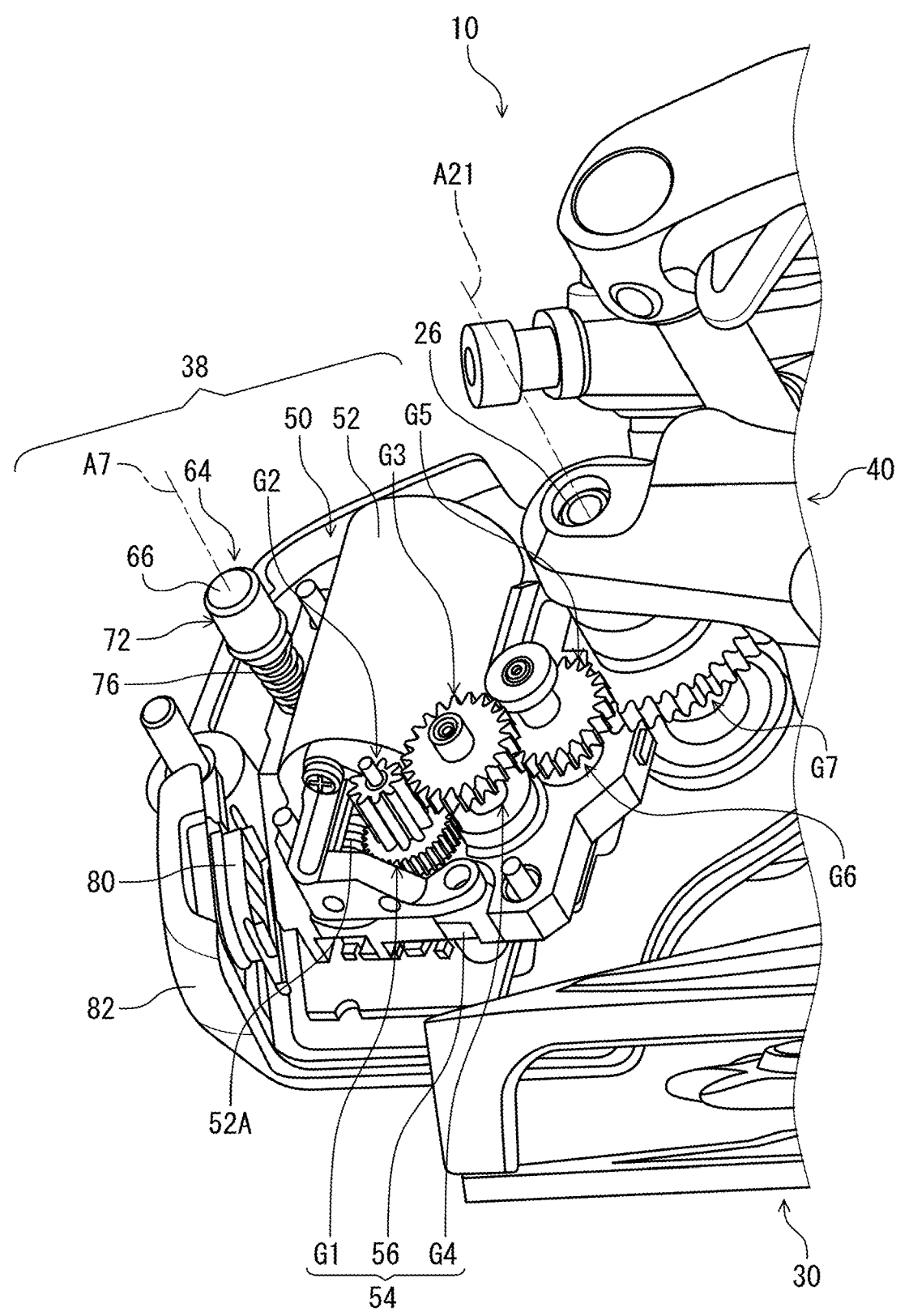
FIG. 6 is a perspective view of the bicycle derailleur illustrated in FIG. 2, with a base member and a motor housing partly omitted.

As seen in FIG. 6, the motor unit 38 is configured to generate rotational force. The motor unit 38 includes a motor 52 and a gear structure 54. Namely, the bicycle derailleur further comprises the motor 52. The motor 52 is configured to generate rotational force. The gear structure 54 is configured to change the rotational force based on a reduction ratio.

The gear structure 54 includes a gear support 56 and a plurality of gears G1 to G7 configured to be rotatably attached to the gear support 56. The motor 52 includes an output shaft 52A having a geared part. For example, the geared part of the output shaft 52A includes a worm gear. The gear G1 meshes with the geared part of the output shaft 52A of the motor 52. The gear G1 is rotatable relative to the housing 42 along with the gear G2. The gear G2 meshes with the gear G3. The gear G3 is rotatable relative to the housing 42 along with the gear G4. The gear G4 meshes with the gear G5. The gear G5 is rotatable relative to the housing 42 along with the gear G6. The gear G6 meshes with the gear G7. The gear G7 is secured to the second link pin 26 of the linkage structure 16. The second link pin 26 is coupled to the saver structure 40 to transmit rotational force transmitted from the motor unit 38 to the saver structure 40. The reduction ratio is defined by the geared part of the output shaft 52A and the plurality of gears G1 to G7.

Figure 7:
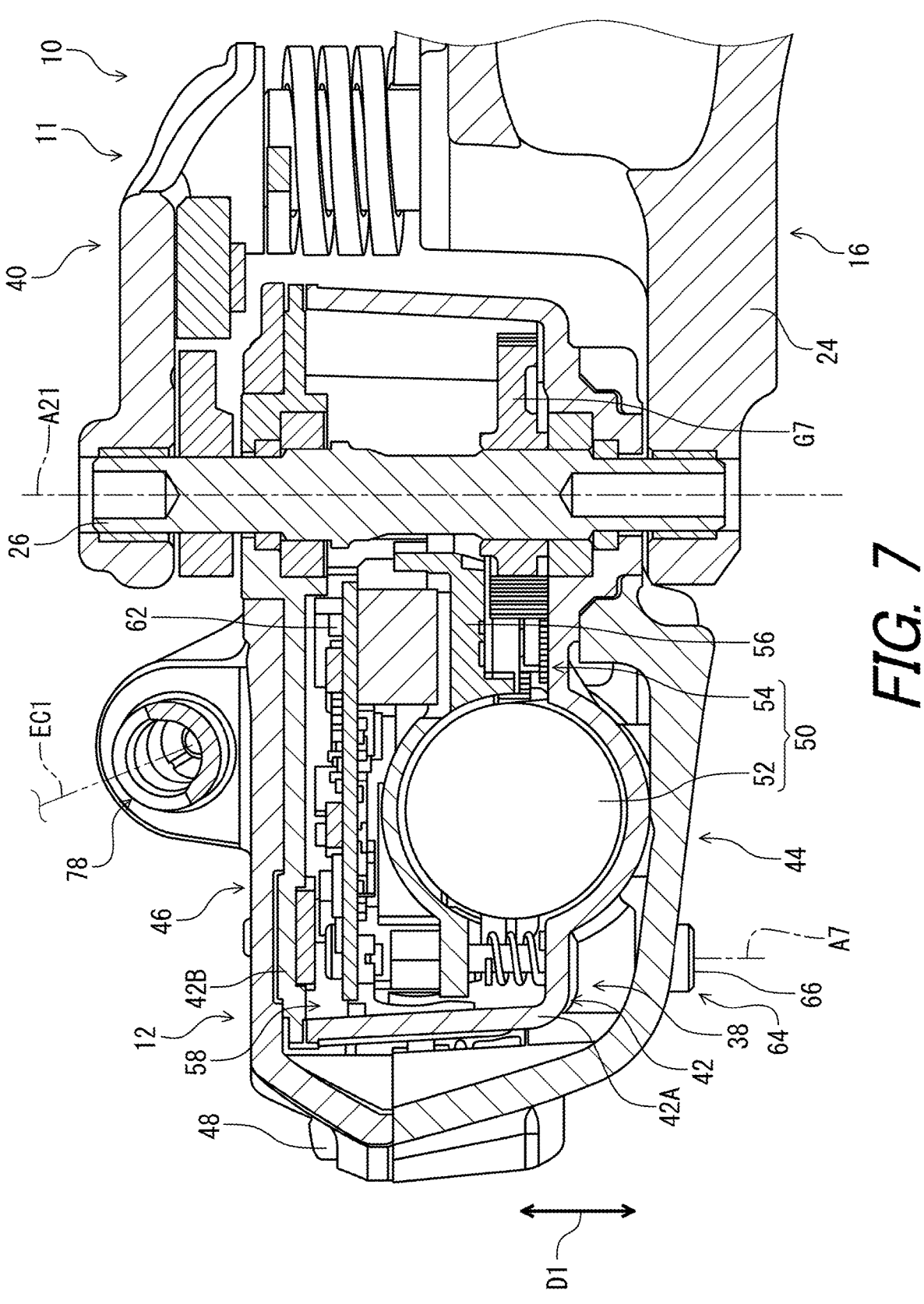
FIG. 7 is a cross-sectional view of the bicycle derailleur along line VII-VII of FIG. 5.

As seen in FIG. 7, the motor unit 38 has an accommodation space 58. The housing 42 has the accommodation space 58. The motor 52 is at least partly provided in the accommodation space 58. The gear structure 54 is at least partly provided in the accommodation space 58. In the present embodiment, the motor 52 is entirely provided in the accommodation space 58. The gear structure 54 is entirely provided in the accommodation space 58. However, the motor 52 can be partly provided in the accommodation space 58 if needed and/or desired. The gear structure 54 can be partly provided in the accommodation space 58 if needed and/or desired.

The housing 42 includes a first housing 42A and a second housing 42B. The second housing 42B is a separate member from the first housing 42A. The second housing 42B is secured to the first housing 42A with fasteners such as screws. The first housing 42A and the second housing 42B define the accommodation space 58.

Figure 8:
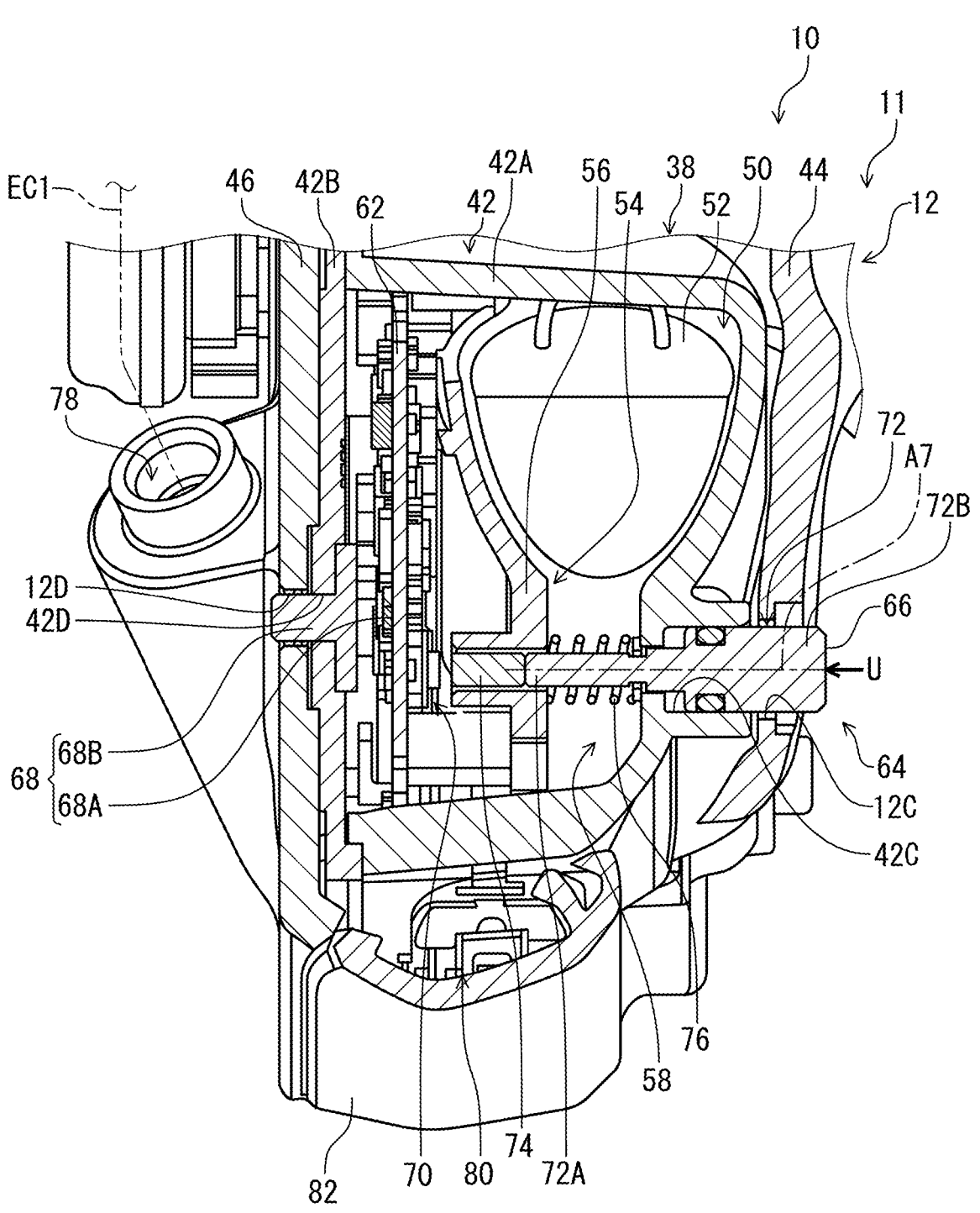
FIG. 8 is a cross-sectional view of the bicycle derailleur along line VIII-VIII of FIG. 5.

As seen in FIG. 8, the motor unit 38 includes a circuit board 62. The bicycle derailleur 10 comprises an electrical user interface 64. The electrical user interface 64 is configured to receive a user input U. The electrical user interface 64 includes a user accessing portion 66 configured to receive the user input U. The motor unit 38 is configured to be electrically connected to the circuit board 62. The electrical user interface 64 is configured to be electrically connected to the circuit board 62. The electrical user interface 64 is configured to be mechanically contact the circuit board 62.

The bicycle derailleur 10 comprises an informing unit 68. The informing unit 68 is configured to inform a user of information. The informing unit 68 is configured to be electrically connected to the circuit board 62.

The circuit board 62 is at least partly provided in the accommodation space 58. The electrical user interface 64 is at least partly provided in the accommodation space 58. The informing unit 68 is at least partly provided in the accommodation space 58.

In the present embodiment, the circuit board 62 is entirely provided in the accommodation space 58. The electrical user interface 64 is partly provided in the accommodation space 58. The informing unit 68 is partly provided in the accommodation space 58. However, the circuit board 62 can be partly provided in the accommodation space 58 if needed and/or desired. The electrical user interface 64 can be entirely provided in the accommodation space 58 if needed and/or desired. The informing unit 68 can be entirely provided in the accommodation space 58 if needed and/or desired.

As seen in FIG. 8, the electrical user interface 64 includes a switch element 70, a button 72, and an elastic member 74. The switch element 70 is configured to be electrically connected to the circuit board 62. The button 72 is configured to be movable relative to the switch element 70. The elastic member 74 is at least partly provided between the switch element 70 and the button 72. The elastic member 74 is configured to be contactable with the switch element 70. The electrical user interface 64 includes a biasing member 76 configured to bias the button 72 to move away from the switch element 70. The biasing member 76 is provided between the housing 42 and the gear support 56 of the gear structure 54. The switch element 70 may include a switch circuit.

The button 72 is movably mounted to the motor unit 38 and the base member 12. The elastic member 74 is movably mounted to the motor unit 38. The button 72 includes the user accessing portion 66. The user accessing portion 66 is configured to be contactable with a user when the electrical user interface 64 is operated by the user. The user accessing portion 66 is configured to be contactable with a user's hand when the electrical user interface 64 is operated by the user.

The button 72 includes a proximal end portion 72A and a distal end portion 72B. The button 72 has a longitudinal center axis A7. The button 72 extend portions between the proximal end portion 72A and the distal end portion 72B along the longitudinal center axis A7. The proximal end portion 72A is closer to the switch element 70 than the distal end portion 72B. The user accessing portion 66 is provided at the distal end portion 72B.

The base member 12 includes an opening 12C. The housing 42 includes an opening 42C. The electrical user interface 64 extends through the openings 12C and 42C. The button 72 extends through the openings 12C and 42C. The button 72 is movably provided in the opening 42C. The button 72 is movably supported by the housing 42. The user accessing portion 66 is provided outside of the housing 42 and the base member 12 to be contactable with a user's hand.

The informing unit 68 includes a light emitter 68A and a light transmission member 68B. The light emitter 68A is configured to emit light. The light emitter 68A is configured to be electrically connected to the circuit board 62. The light transmission member 68B is configured to transmit light emitted from the light emitter 68A. The light transmission member 68B is made of a transparent material. The housing 42 includes a hole 42D. The base member 12 includes a hole 12D. The light transmission member 68B is partly provided in the holes 42D and 12D to conduct light from the accommodation space 58 to the outside of the bicycle derailleur 10.

Figure 9:
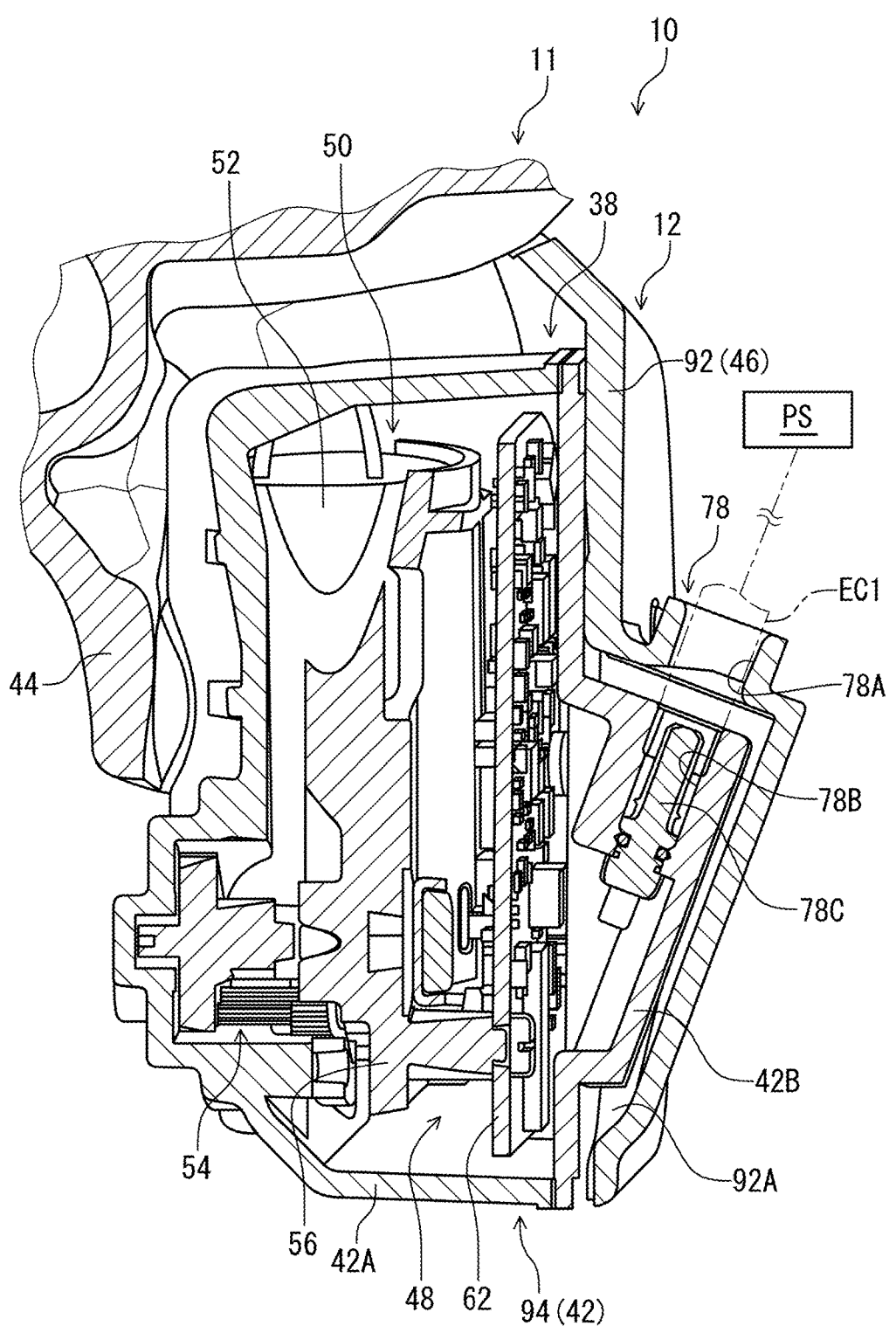
FIG. 9 is a cross-sectional view of the bicycle derailleur illustrated in FIG. 2.

As seen in FIG. 9, the bicycle derailleur 10 further comprises an electric connecting portion 78. The electric connecting portion 78 is configured to be electrically connected to the electric power source PS. The electric connecting portion 78 is configured to be electrically connected to the circuit board 62. The electric connecting portion 78 is configured to be electrically connected to an electric cable EC1 and is provided to at least one of the base member 12 and the housing 42. Thus, the electric connecting portion 78 can also be referred to as an electric port 78. The electric connecting portion 78 is configured to receive electric power through the electric cable EC1. The electric connecting portion 78 is configured to receive electric power from a electric power source PS through the electric cable EC1. The electric power source PS includes a secondary battery, for example.

In the present embodiment, the electric connecting portion 78 is provided to at least one of the base member 12 and the motor unit 38. The electric connecting portion 78 is provided to at least one of the base member 12. The electric connecting portion 78 is provided to at least one of the motor unit 38. The electric connecting portion 78 is provided to the base member 12 and the motor unit 38. The electric connecting portion 78 includes a first hole 78A, a second hole 78B, and an electric connector 78C. The first hole 78A is provided to the base member 12. The second hole 78B is provided to the housing 42. The electric connector 78C is provided in the second hole 78B. The electric connector 78C is configured to be electrically connected to the circuit board 62.

Figure 10:
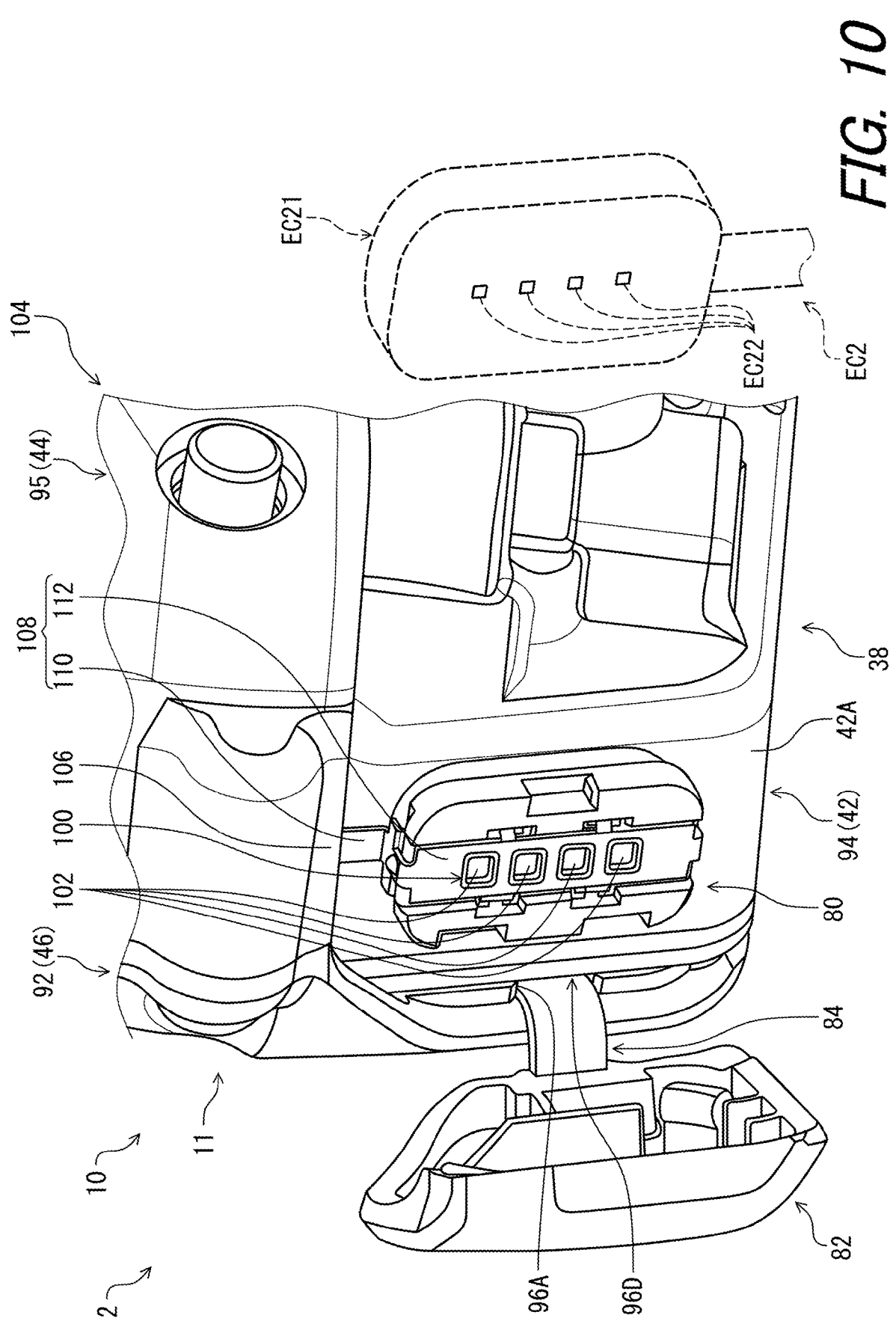
FIG. 10 is a perspective view of the bicycle derailleur illustrated in FIG. 2 (detachment state).

As seen in FIG. 10, the bicycle derailleur 10 comprises a charging port 80. The charging port 80 is configured to be detachably connected to a charging cable EC2 to charge the electric power source PS. The charging port 80 is configured to be electrically connected to the circuit board 62 (see, e.g., FIG. 9). The charging port 80 is provided to at least one of the base member 12 and the motor unit 38. The charging port 80 is configured to receive electric power through the charging cable EC2. The charging port 80 is configured to receive charging power through the charging cable EC2. The electric power source PS (see, e.g., FIG. 9) is configured to be recharged through the electric connecting portion 78 (see, e.g., FIG. 9) using charging power received by the charging port 80. The electric power source PS can be omitted from the bicycle 2.

In the present embodiment, the charging port 80 is provided to the motor unit 38. The charging port 80 is provided to the housing 42 to be exposed from the housing 42. However, the charging port 80 can be provided to the base member 12 or both the base member 12 and the motor unit 38.

The bicycle derailleur 10 comprises a charging-port cover 82. The charging-port cover 82 is configured to be detachably attached to the charging port 80. The charging-port cover 82 has a detachment state in which the charging-port cover 82 is detached from the derailleur body 11 to allow connection between the charging port 80 and the charging cable EC2. In the detachment state, the charging-port cover 82 is detached from the housing 42 of the motor unit 38 allow connection between the charging port 80 and the charging cable EC2.

The charging-port cover 82 is detachable from the derailleur body 11 without substantial damage and is attachable to the derailleur body 11 again. The charging-port cover 82 is detachable from the housing 42 of the motor unit 38 without substantial damage and is attachable to the housing 42 of the motor unit 38 again.

The bicycle derailleur 10 comprises a cover connector 84. The cover connector 84 is configured to couple the charging-port cover 82 to the derailleur body 11 in the detachment state. The cover connector 84 is configured to couple the charging-port cover 82 to the housing 42 of the motor unit 38 in the detachment state. The cover connector 84 is coupled to both the charging-port cover 82 and the derailleur body 11 in the detachment state. The cover connector 84 is coupled to both the charging-port cover 82 and the housing 42 of the motor unit 38 in the detachment state.

Figure 11:
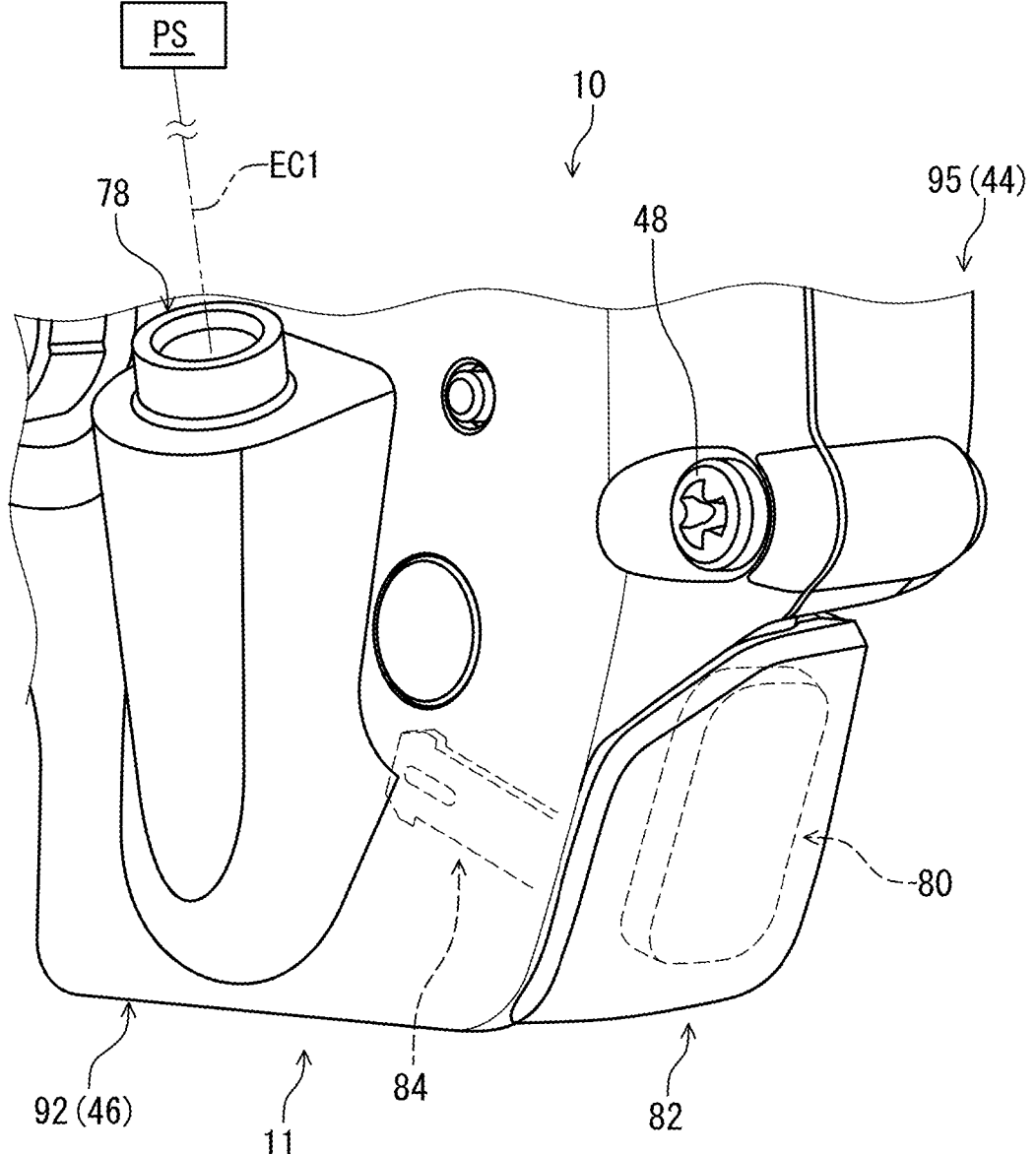
FIG. 11 is a perspective view of the bicycle derailleur illustrated in FIG. 2 (attachment state).

As seen in FIG. 11, the charging-port cover 82 has an attachment state in which the charging-port cover 82 is attached to the derailleur body 11 to cover the charging port 80. The cover connector 84 is configured to couple the charging-port cover 82 to the derailleur body 11 in at least the detachment state. The cover connector 84 is coupled to both the charging-port cover 82 and the derailleur body 11 in the attachment state. A part of the cover connector 84 is disposed between the base member 12 and the motor unit 38. The cover connector 84 is coupled to both the charging-port cover 82 and the housing 42 of the motor unit 38 in the attachment state. The cover connector 84 is at least partially disposed in a coupling groove 96 of the base member 12. The cover connector 84 can be at least partially disposed in the coupling groove 96 of the housing 42.

The charging-port cover 82 is made of a first material. The cover connector 84 is made of a second material. The second material is different from the first material. The second material is softer than the first material. The first material includes synthetic resin such as plastic. The second material includes an elastic material. The elastic material includes rubber. The first material can be elastin material. However, the first material and the second material are not limited to the above materials. The second material can be the same as the first material. The cover connector 84 can be integrally provided with the charging-port cover 82 as a one-piece unitary member. Yung's module of the first material is higher than the Yung's module of the second material.

Figure 12:
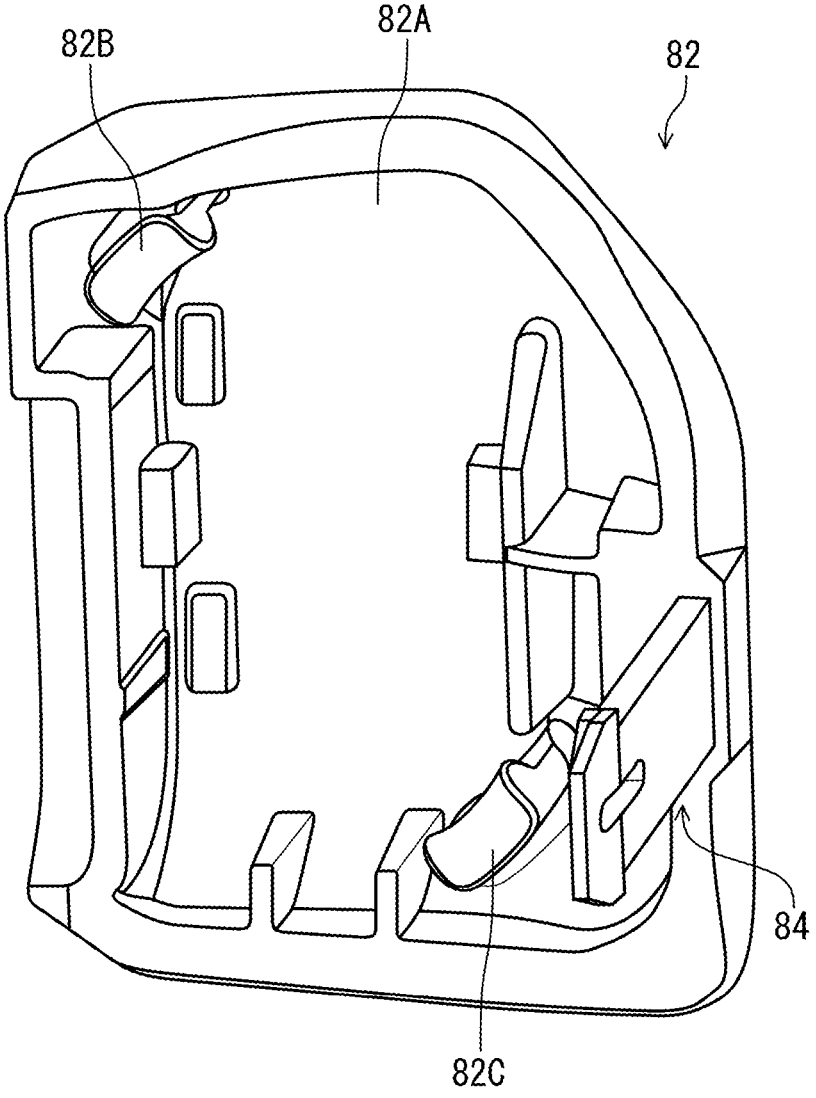
FIG. 12 is a perspective view of a charging-port cover and a cover connecter of the bicycle derailleur illustrated in FIG. 2.

As seen in FIG. 12, the charging-port cover 82 includes a cover body 82A, a first engagement part 82B, and a second engagement part 82C. The cover body 82A is configured to cover the charging port 80 in the attachment state. The first engagement part 82B and the second engagement part 82C extend from the cover body 82A. The first engagement part 82B and the second engagement part 82C are configured to be engaged with the charging port 80. The first engagement part 82B and the second engagement part 82C are elastically deformable to detachably hold the charging port 80 between the first engagement part 82B and the second engagement part 82C.

Figure 13:
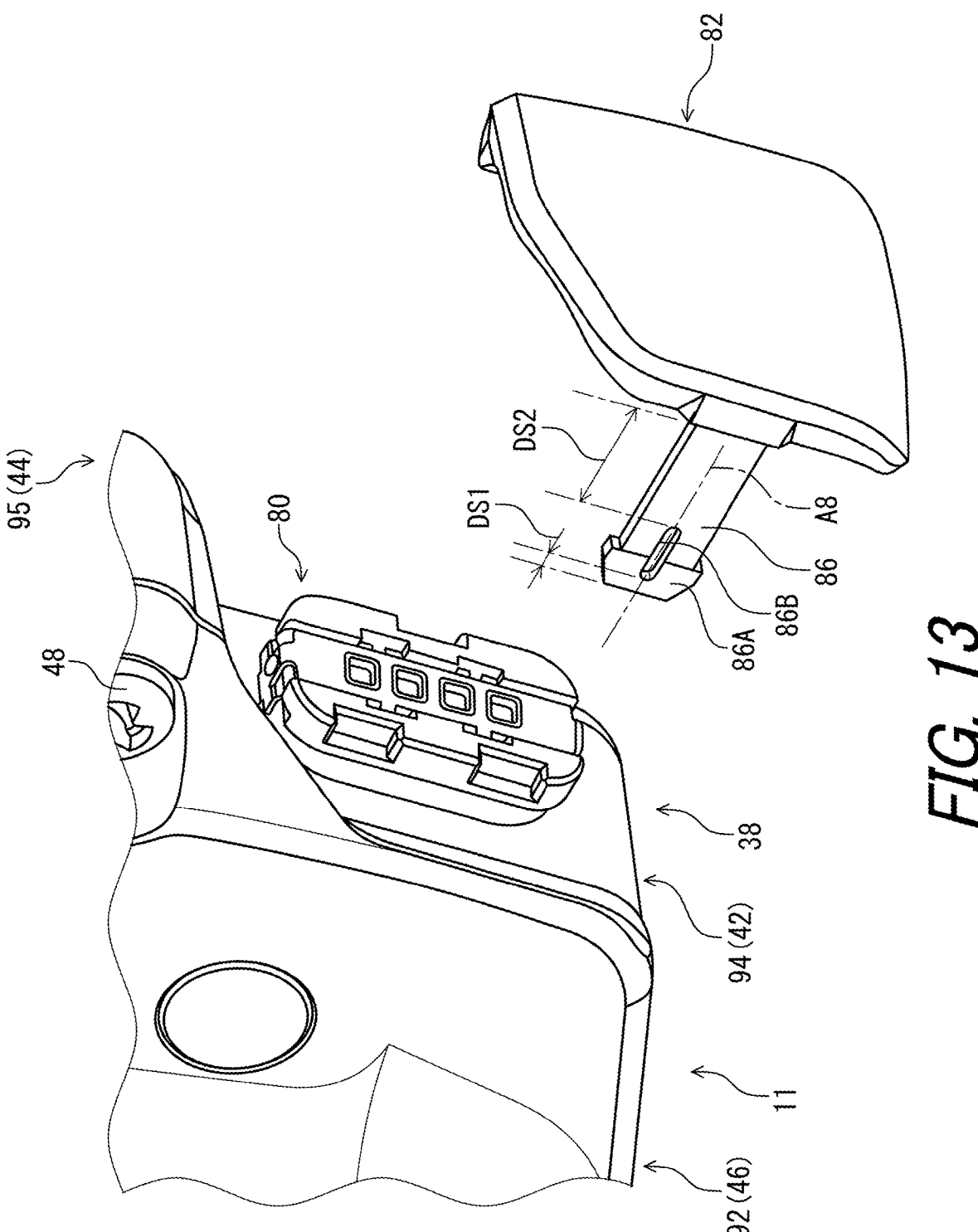
FIG. 13 is an exploded perspective view of the bicycle derailleur illustrated in FIG. 2.

As seen in FIG. 13, the cover connector 84 is configured to be detachably coupled to the derailleur body 11. The cover connector 84 includes a connector body 86 extending from the charging-port cover 82 to the derailleur body 11 in a state where the cover connector 84 is coupled to the derailleur body 11. The cover connector 84 includes a connector body 86 extending from the charging-port cover 82 to the derailleur body 11 in the attachment state (see, e.g., FIG. 11). The connector body 86 includes a longitudinal axis A8 and a connector end 86A provided farthest from the charging-port cover 82 along the longitudinal axis A8. The connector body 86 has a strip shape extending along the longitudinal axis A8. The longitudinal axis A8 is defined in a center of a width and a thickness of the connector body 86. The charging-port cover 82 can be a separate member from the connector body 86 or integrally provided with the connector body 86 as a one-piece unitary member.

The connector body 86 includes an opening 86B provided between the charging-port cover 82 and the connector end 86A. The opening 86B has an elongated shape extending along the longitudinal axis A8. A first distance DS1 defined between the opening 86B and the connector end 86A along the longitudinal axis A8 is shorter than a second distance DS2 between the opening 86B and the charging-port cover 82 along the longitudinal axis A8.

Figure 14:
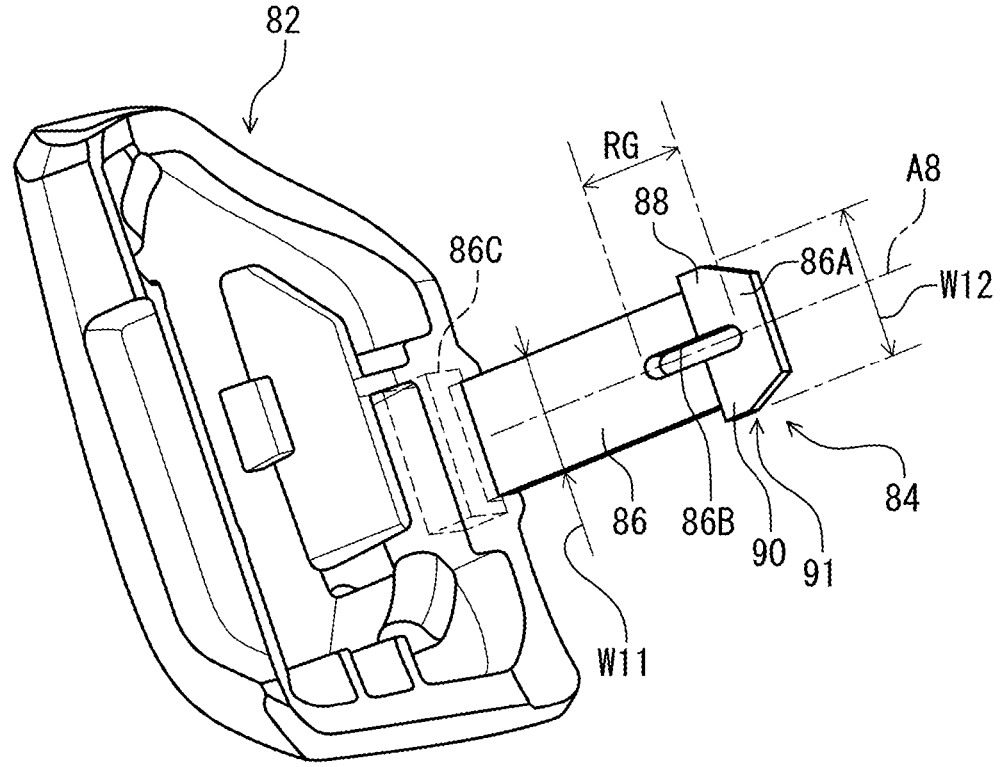
FIG. 14 is a perspective view of the charging-port cover and the cover connecter of the bicycle derailleur illustrated in FIG. 2.

As seen in FIG. 14, the cover connector 84 includes a first protrusion 88 protruding from the connector body 86 away from the longitudinal axis A8. The cover connector 84 includes a second protrusion 90 protruding from the connector body 86 away from the longitudinal axis A8 and the first protrusion 88. At least one of the first protrusion 88 and the second protrusion 90 is closer to the connector end 86A than to the charging-port cover 82. In the present embodiment, each of the first protrusion 88 and the second protrusion 90 are closer to the connector end 86A than to the charging-port cover 82. The first protrusion 88 and the second protrusion 90 constitute a larger-width part 91 provided at the connector end 86A. At least one of the first protrusion 88 and the second protrusion 90 is at least partly provided in a range RG defined by the opening 86B along the longitudinal axis A8. The first protrusion 88 and the second protrusion 90 are entirely provided in the range RG. However, the positional relationship between the first protrusion 88, the second protrusion 90, and the connector end 86A is not limited to the above relationship. At least one of the first protrusion 88 and the second protrusion 90 can be at least partly provided outside the range RG.

The connector body 86 includes an additional connector end 86C opposite to the connector end 86A. The additional connector end 86C is provided inside the charging-port cover 82. The additional connector end 86C is embedded in the charging-port cover 82 by an insert molding, for example.

The cover connector 84 has a first connector width W11 and a second connector width W12. Each of the first connector width W11 and the second connector width W12 is defined in a direction perpendicular to the longitudinal axis A8. The first connector width W11 is defined by the connector body 86. The second connector width W12 is defined by the first protrusion 88 and the second protrusion 90. The larger-width part 91 has the second connector width W12. The first connector width W11 is smaller than the second connector width W12.

Figure 15:
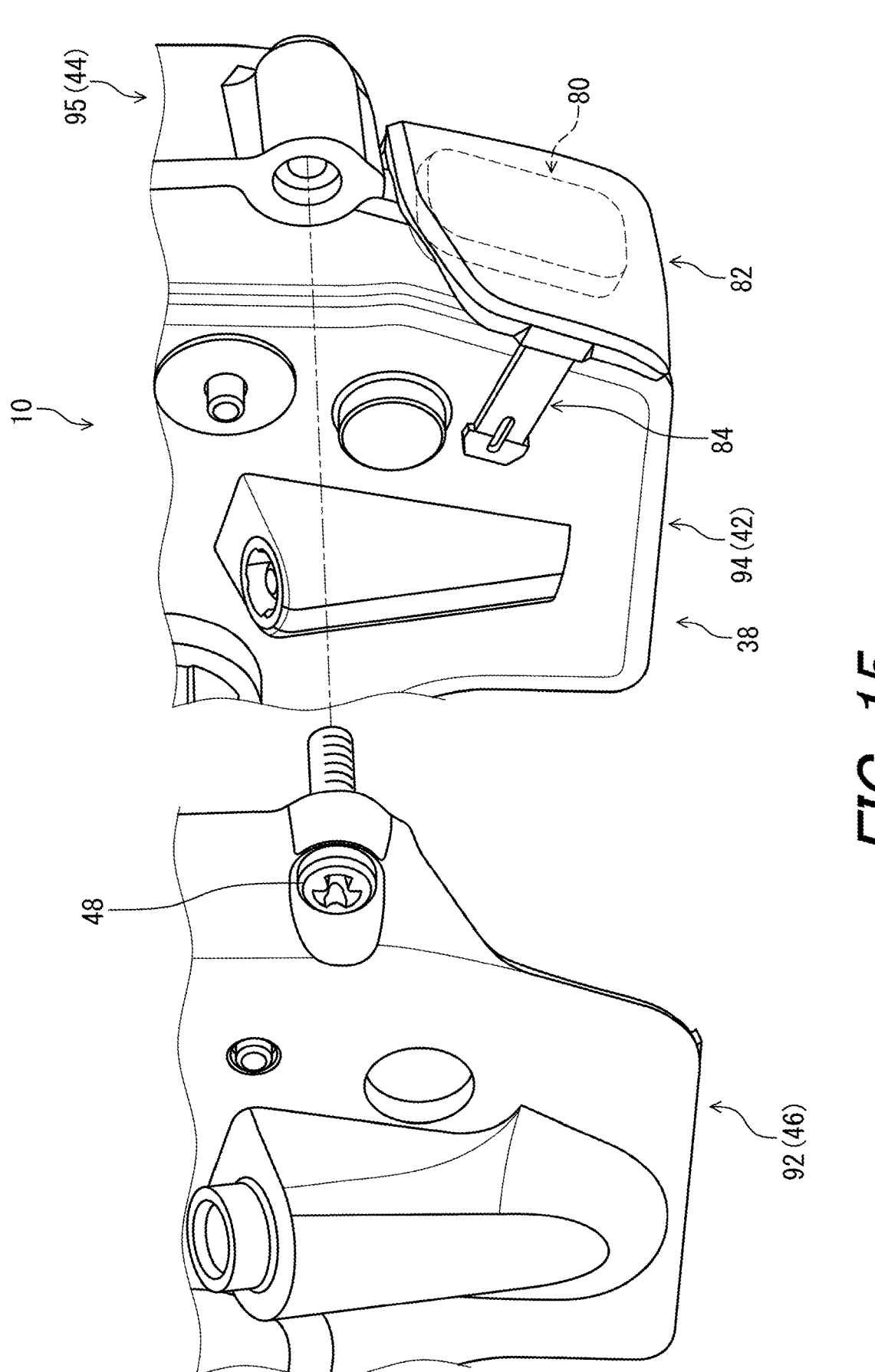
FIG. 15 is an exploded perspective view of the bicycle derailleur illustrated in FIG. 2.

As seen in FIG. 15, the derailleur body 11 includes a first member 92 and a second member 94 configured to be attached to the first member 92. One of the base member 12 and the movable member 14 includes the first member 92. In the present embodiment, the base member 12 includes the first member 92. However, the movable member 14 can include the first member 92.

The first member 92 corresponds to the second base member 46 of the base member 12. The second member 94 corresponds to the housing 42 of the motor unit 38. Thus, the first member 92 can also be referred to as the second base member 46. The second member 94 can also be referred to as the housing 42. The second member 94 includes the accommodation space 58 (see, e.g., FIG. 17). However, the first member 92 can correspond to the motor unit 38. The second member 94 corresponds to the base member 12.

The cover connector 84 is configured to be at least partly provided between the first member 92 and the second member 94 to couple the charging-port cover 82 to the derailleur body 11. In the present embodiment, the cover connector 84 is configured to be partly provided between the first member 92 and the second member 94 to couple the charging-port cover 82 to the derailleur body 11. However, the cover connector 84 can be configured to be entirely provided between the first member 92 and the second member 94 to couple the charging-port cover 82 to the derailleur body 11.

The derailleur body 11 includes a third member 95 which is a separate member from the second member 94. The third member 95 is a separate member from the first member 92. The second member 94 is at least partly covered by the first member 92 and the third member 95. In the present embodiment, the second member 94 is partly covered by the first member 92 and the third member 95. The third member 95 corresponds to the first base member 44 of the base member 12.

Figure 16:
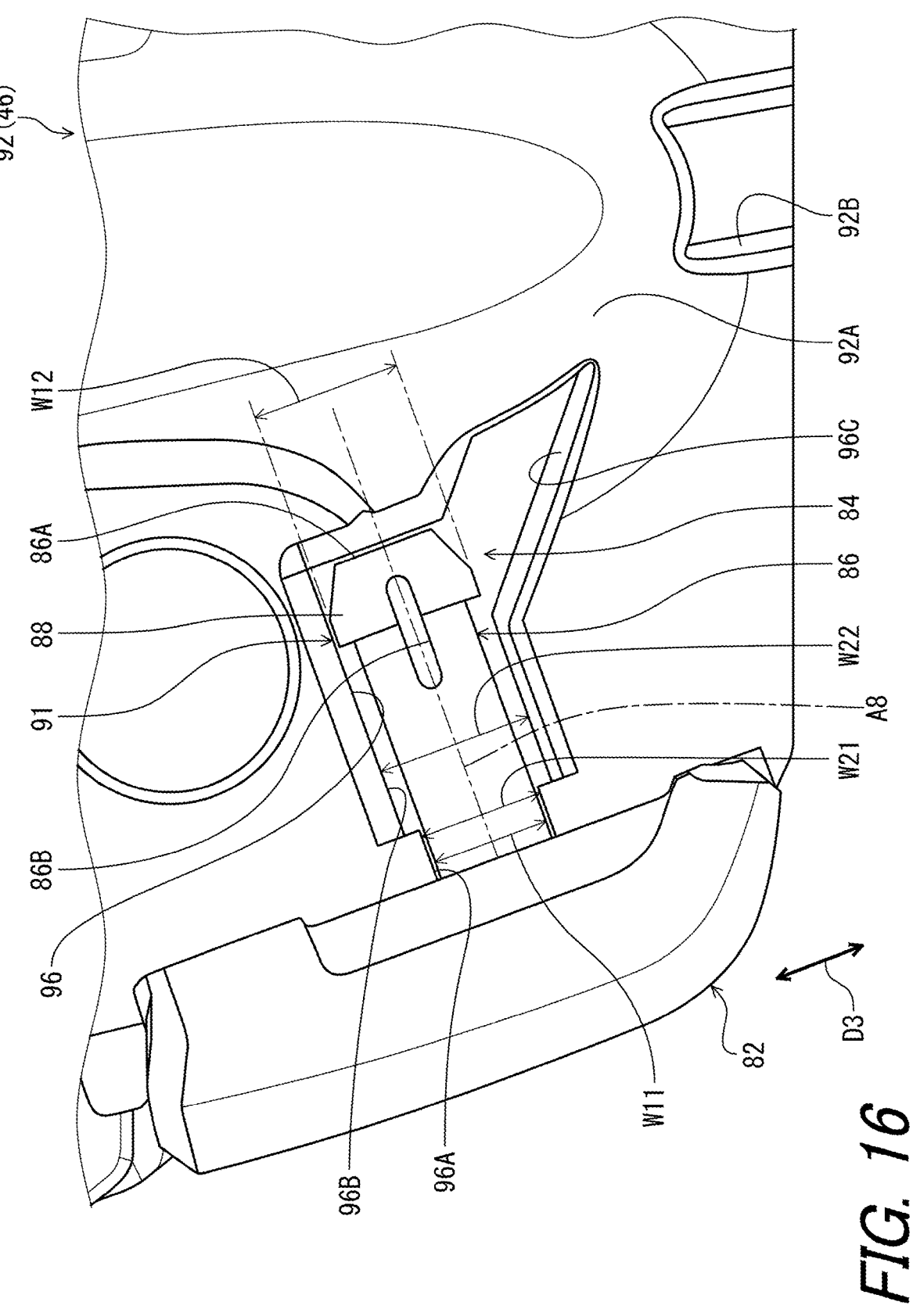
FIG. 16 is a plan view of a first member, the charging-port cover, and the cover connecter of the bicycle derailleur illustrated in FIG. 2.

As seen in FIG. 16, at least one of the first member 92 and the second member 94 includes a coupling groove 96 provided on the at least one of the first member 92 and the second member 94. The cover connector 84 is configured to be at least partly provided in the coupling groove 96 to couple the charging-port cover 82 to the derailleur body 11. In the present embodiment, the first member 92 includes the coupling groove 96. The cover connector 84 is configured to be at least partly provided in the coupling groove 96 to couple the charging-port cover 82 to the housing 42 of the motor unit 38. However, the second member 94 or both the first member 92 and the second member 94 can include the coupling groove 96.

The coupling groove 96 includes a first groove 96A and a second groove 96B. The first groove 96A is connected to the second groove 96B. The first groove 96A is provided between the charging-port cover 82 and the second groove 96B in the attachment state. The first groove 96A has a first width W21 defined in a width direction D3. The second groove 96B is connected to the first groove 96A. The second groove 96B has a second width W22 defined in the width direction D3. The second width W22 of the second groove 96B is larger than the first width W21 of the first groove 96A. The first groove 96A and the second groove 96B are provided on the first member 92 as a recess.

The first connector width W11 of the cover connector 84 is smaller than the first width W21 of the first groove 96A. The second connector width W12 of the cover connector 84 is larger than the first width W21 of the first groove 96A. In a state where the first protrusion 88 and the second protrusion 90 are provided in the second groove 96B, the first protrusion 88 and the second protrusion 90 keep the cover connector 84 to be coupled to the derailleur body 11. The second connector width W12 of the cover connector 84 is smaller than the second width W22 of the first groove 96A. Thus, the cover connector 84 is movably provided in the coupling groove 96.

The cover connector 84 is elastically deformable when the cover connector 84 is removed from the coupling groove 96. The first protrusion 88 and the second protrusion 90 are pushed by inner surfaces of the first groove 96A toward the longitudinal axis A8 when the first protrusion 88 and the second protrusion 90 enter the first groove 96A. At this time, the cover connector 84 is elastically deformed because of the opening 86B. This makes the second connector width W12 of the larger-width part 91 smaller, allowing the cover connector 84 to be removed from the coupling groove 96. The connector end 86A can be inserted into the coupling groove 96 because the larger-width part 91 is elastically deformable because of the opening 86B.

The coupling groove 96 includes a third groove 96C. The third groove 96C is connected to the second groove 96B. The second groove 96B is provided between the first groove 96A and the third groove 96C.

The first member 92 includes a recess 92A and an additional groove 92B. The third groove 96C is connected to the recess 92A. The additional groove 92B is connected to the recess 92A. The additional groove 92B connects the recess 92A to the outside of the derailleur body 11.

As seen in FIG. 10, the first groove 96A includes an opening 96D provided on an outer surface of the derailleur body 11. Even if the foreign objects enter the coupling groove 96 through the opening 96D, it is possible to discharge the foreign objects through the coupling groove 96, the recess 92A, and the additional groove 92B (see, e.g., FIG. 16).

Figure 17:
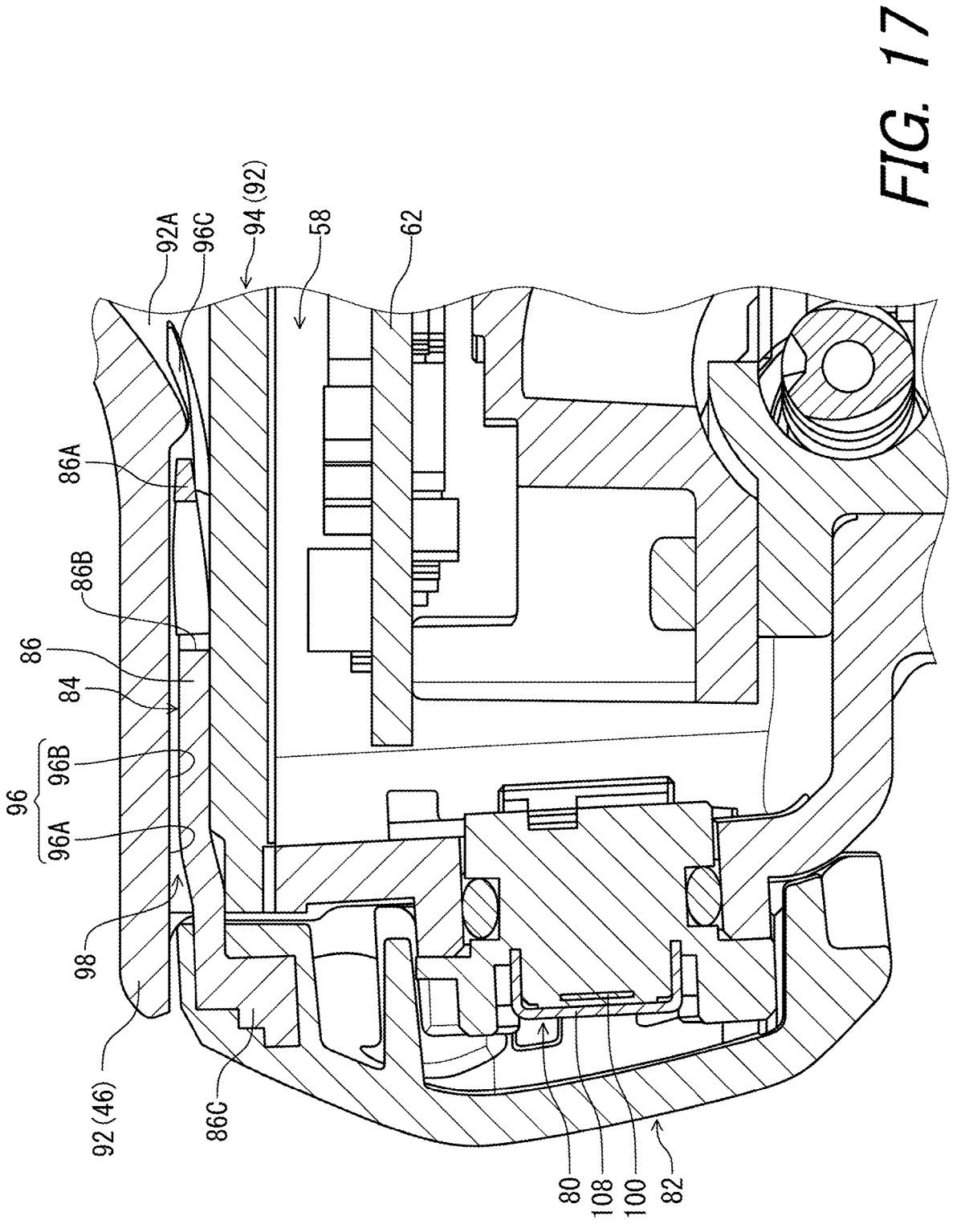
FIG. 17 is a cross-sectional view of the bicycle derailleur illustrated in FIG. 2.

As seen in FIG. 17, the first member 92 and the second member 94 define an insertion space 98. The insertion space 98 includes the coupling groove 96. The cover connector 84 is provided in the insertion space 98. The cover connector 84 is configured to be at least partly provided in the second groove 96B to couple the charging-port cover 82 to the derailleur body 11. The cover connector 84 is configured to be partly provided in the second groove 96B to couple the charging-port cover 82 to the derailleur body 11. However, the cover connector 84 can be configured to be entirely provided in the second groove 96B.

As seen in FIG. 10, the bicycle derailleur 10 comprises an electric terminal 100. The charging port 80 includes the electric terminal 100. The electric terminal 100 is made of a first conductive material. The electric terminal 100 includes a terminal surface 102. In the present embodiment, the electric terminal 100 includes a plurality of terminal surfaces 102. The charging cable EC2 includes a connector EC21. The connector EC21 includes a plurality of external electric terminals EC22. The terminal surface 102 is configured to be contactable with the external electric terminal EC22 to receive electric power from the external electric terminal EC22. The electric terminal 100 is electrically connected to the circuit board 62 (see, e.g., FIG. 17).

The bicycle derailleur 10 comprises a component body 104. The electric terminal 100 is provided to at least one of the component body 104 and the motor unit 38. In the present embodiment, the electric terminal 100 is provided to the motor unit 38. The electric terminal 100 is provided to the housing 42 of the motor unit 38. However, the electric terminal 100 can be provided to the component body 104 or both the component body 104 and the motor unit 38.

The motor unit 38 is at least partially covered by the component body 104. The motor unit 38 is partially covered by the component body 104. However, the motor unit 38 can be entirely covered by the component body 104.

The component body 104 includes a conductive part 106 made of a second conductive material. In the present embodiment, the derailleur body 11 includes the component body 104. The conductive part 106 is provided to the base member 12. The second conductive material of the conductive part 106 is different from the first conductive material of the electric terminal 100. However, the second conductive material of the conductive part 106 can be the same as the first conductive material of the electric terminal 100.

In the present embodiment, the conductive part 106 is integrally provided with the first base member 44 of the base member 12 as a one-piece unitary member. The first base member 44 is made of a conductive material and serves as the conductive part 106. However, the conductive part 106 can be a separate member from the base member 12. The conductive part 106 can be a pin, a screw, a conductive plated layer. The conductive part 106 can be a composite material of resin and metallic material.

The bicycle derailleur 10 comprises a terminal protector 108 made of a third conductive material. The terminal protector 108 is a separate member from the component body 104. The terminal protector 108 includes a contact part 110 and a protector body 112. The contact part 110 is configured to be contactable with the conductive part 106 of the component body 104. The protector body 112 is spaced apart from the electric terminal 100 and is provided closer to the terminal surface 102 than the contact part 110.

Figure 18:
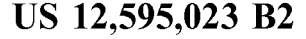
FIG. 18 is a plan view of a charging port of the bicycle derailleur illustrated in FIG. 2.

As seen in FIG. 18, the terminal protector 108 is provided to avoid overlapping with the terminal surface 102 as viewed in a perpendicular direction perpendicular to the terminal surface 102. However, the terminal protector 108 can be provided to overlap with the terminal surface 102 as viewed in the perpendicular direction perpendicular to the terminal surface 102.

Figure 19:
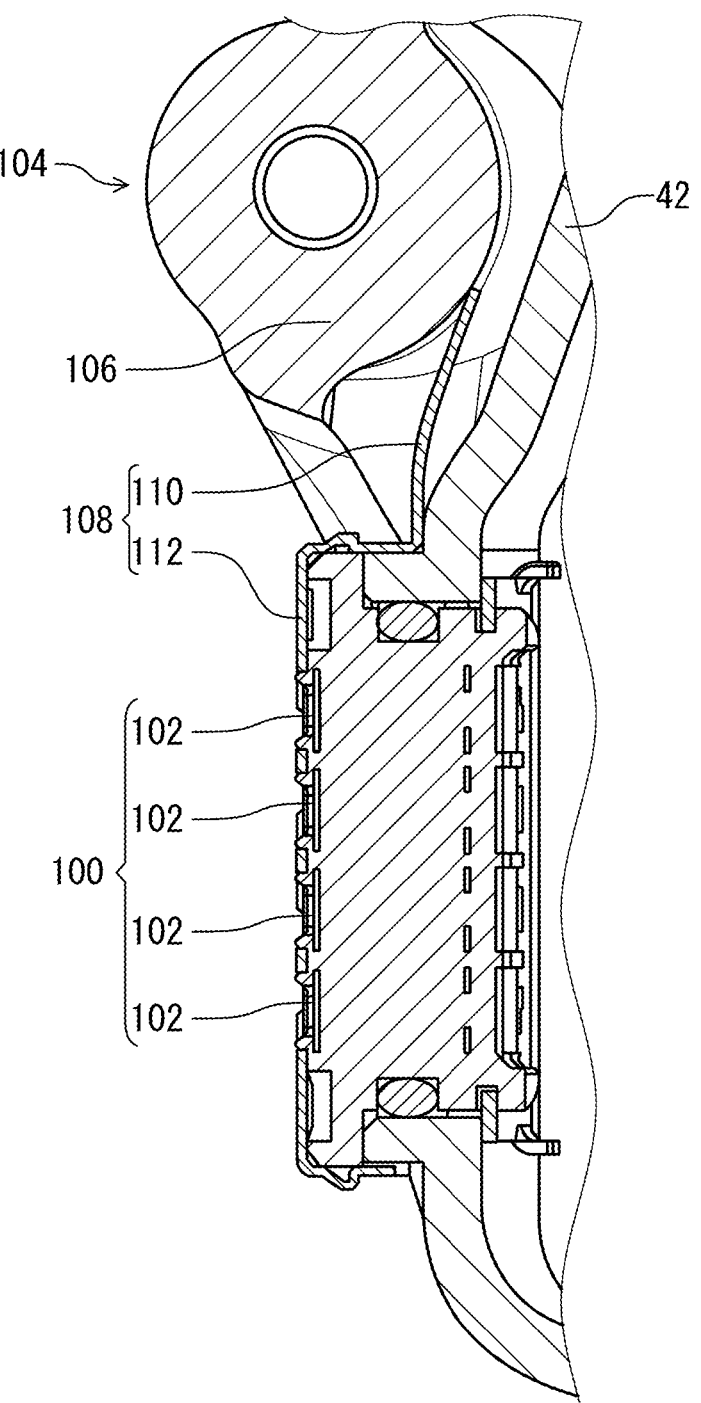
FIG. 19 is a cross-sectional view of the bicycle derailleur along line XIX-XIX of FIG. 18.

As seen in FIG. 19, the contact part 110 is configured to be contactable with the housing 42. The contact part 110 is configured to be contactable with the component body 104. The contact part 110 is a separate part from the conductive part 106 of the component body 104. The contact part 110 is a separate part from the housing 42 of the motor unit 38.

In the present embodiment, the contact part 110 is integrally provided with the protector body 112 as a one-piece unitary member. However, the contact part 110 can be a separate part from the protector body 112. The contact part 110 can be a conductive plated layer provided on the component body 104 and/or the motor unit 38.

In accordance with a first aspect of the embodiments, a bicycle derailleur comprises a derailleur body, a charging port, a charging-port cover, and a cover connector. The charging port is configured to be detachably connected to a charging cable to charge an electric power source. The charging-port cover is configured to be detachably attached to the charging port. The charging-port cover has a detachment state in which the charging-port cover is detached from the derailleur body to allow connection between the charging port and the charging cable. The cover connector is configured to couple the charging-port cover to the derailleur body in the detachment state.

With the bicycle derailleur according to the first aspect, it is possible to smoothly charge the electric power source using the charging port without worrying that the charging-port cover is lost.

In accordance with a second aspect of the embodiments, the bicycle derailleur according to the first aspect is configured so that the charging-port cover has an attachment state in which the charging-port cover is attached to the derailleur body to cover the charging port. The cover connector is configured to couple the charging-port cover to the derailleur body in at least the detachment state.

With the bicycle derailleur according to the second aspect, it is possible to protect the charging port with the charging-port cover.

In accordance with a third aspect of the embodiments, the bicycle derailleur according to the first or second aspect is configured so that the charging-port cover is made of a first material. The cover connector is made of a second material. The second material is different from the first material.

With the bicycle derailleur according to the third aspect, it is possible to choose materials of the charging-port cover and the cover connector depending on the specification of the bicycle derailleur.

In accordance with a fourth aspect of the embodiments, the bicycle derailleur according to the third aspect is configured so that the second material is softer than the first material.

With the bicycle derailleur according to the fourth aspect, it is possible to easily put the charging-port cover in the detachment state while the cover connector couples the charging-port cover to the derailleur body.

In accordance with a fifth aspect of the embodiments, the bicycle derailleur according to the third or fourth aspect is configured so that the second material includes an elastic material.

With the bicycle derailleur according to the fifth aspect, it is possible to more easily put the charging-port cover in the detachment state while the cover connector couples the charging-port cover to the derailleur body.

In accordance with a sixth aspect of the embodiments, the bicycle derailleur according to any one of the first to fifth aspects is configured so that the cover connector is configured to be detachably coupled to the derailleur body.

With the bicycle derailleur according to the sixth aspect, it is possible to replace one of the cover connector and the charging-port cover with a new one. Furthermore, it is possible to easily do maintenance of the bicycle derailleur around the charging port by detaching the cover connector and the charging-port cover from the derailleur body.

In accordance with a seventh aspect of the embodiments, the bicycle derailleur according to any one of the first to sixth aspects is configured so that the cover connector includes a connector body extending from the charging-port cover to the derailleur body in a state where the cover connector is coupled to the derailleur body.

With the bicycle derailleur according to the seventh aspect, it is possible to reliably connect the charging-port cover to the derailleur body.

In accordance with an eighth aspect of the embodiments, the bicycle derailleur according to any one of the first to seventh aspects is configured so that the connector body includes a longitudinal axis and a connector end provided farthest from the charging-port cover along the longitudinal axis.

With the bicycle derailleur according to the eighth aspect, it is possible to easily move the charging-port cover relative to the derailleur body in the detachment state.

In accordance with a ninth aspect of the embodiments, the bicycle derailleur according to the eighth aspect is configured so that the connector body includes an opening provided between the charging-port cover and the connector end.

With the bicycle derailleur according to the ninth aspect, the opening can save weigh of the connector body and/or improve flexibility of the connector body.

In accordance with a tenth aspect of the embodiments, the bicycle derailleur according to the ninth aspect is configured so that the opening has an elongated shape extending along the longitudinal axis.

With the bicycle derailleur according to the tenth aspect, it is possible to fit the shape of the opening to the shape of the connector body.

In accordance with an eleventh aspect of the embodiments, the bicycle derailleur according to the ninth or tenth aspect is configured so that a first distance defined between the opening and the connector end along the longitudinal axis is shorter than a second distance between the opening and the charging-port cover along the longitudinal axis.

With the bicycle derailleur according to the eleventh aspect, the opening can improve flexibility of the connector body around the connecting end.

In accordance with a twelfth aspect of the embodiments, the bicycle derailleur according to any one of the eighth to eleventh aspects is configured so that the connector body has a strip shape extending along the longitudinal axis.

With the bicycle derailleur according to the twelfth aspect, it is possible to improve flexibility of the connector body while maintaining strength of the connector body.

In accordance with a thirteenth aspect of the embodiments, the bicycle derailleur according to any one of the eighth to twelfth aspects is configured so that the cover connector includes a first protrusion protruding from the connector body away from the longitudinal axis.

With the bicycle derailleur according to the thirteenth aspect, the first protrusion can keep the cover connector connected to the derailleur body.

In accordance with a fourteenth aspect of the embodiments, the bicycle derailleur according to the thirteenth aspect is configured so that the cover connector includes a second protrusion protruding from the connector body away from the longitudinal axis and the first protrusion.

With the bicycle derailleur according to the fourteenth aspect, the first protrusion and the second protrusion can reliably keep the cover connector connected to the derailleur body.

In accordance with a fifteenth aspect of the embodiments, the bicycle derailleur according to the fourteenth aspect is configured so that at least one of the first protrusion and the second protrusion is closer to the connector end than to the charging-port cover.

With the bicycle derailleur according to the fifteenth aspect, it is possible to utilize the length of the connector body to easily move the charging-port cover relative to the derailleur body while the first protrusion and the second protrusion reliably keep the cover connector connected to the derailleur body.

In accordance with a sixteenth aspect of the embodiments, the bicycle derailleur according to any one of the first to fifteenth aspects is configured so that the derailleur body includes a first member and a second member configured to be attached to the first member. The cover connector is configured to be at least partly provided between the first member and the second member to couple the charging-port cover to the derailleur body.

With the bicycle derailleur according to the sixteenth aspect, it is possible to couple the cover connector to the derailleur body with a simple structure.

In accordance with a seventeenth aspect of the embodiments, the bicycle derailleur according to the sixteenth aspect is configured so that at least one of the first member and the second member includes a coupling groove provided on the at least one of the first member and the second member. The cover connector is configured to be at least partly provided in the coupling groove to couple the charging-port cover to the derailleur body.

With the bicycle derailleur according to the seventeenth aspect, it is possible to at least partly accommodate the cover connector in the coupling groove in a state where the charging-port cover is attached to the derailleur body.

In accordance with an eighteenth aspect of the embodiments, the bicycle derailleur according to the seventeenth aspect is configured so that the coupling groove includes a first groove and a second groove. The first groove includes an opening provided on an outer surface of the derailleur body. The first groove has a first width defined in a width direction. The second groove is connected to the first groove. The second groove has a second width defined in the width direction. The second width of the second groove is larger than the first width of the first groove.

With the bicycle derailleur according to the eighteenth aspect, it is possible to couple the cover connector to the derailleur body by arranging a larger portion of the cover connector in the second groove.

In accordance with a nineteenth aspect of the embodiments, the bicycle derailleur according to the eighteenth aspect is configured so that the cover connector is configured to be at least partly provided in the second groove to couple the charging-port cover to the derailleur body.

With the bicycle derailleur according to the nineteenth aspect, it is possible to reliably couple the cover connector to the derailleur body by arranging a larger portion of the cover connector in the second groove.

In accordance with a twentieth aspect of the embodiments, the bicycle derailleur according to any one of the sixteenth to nineteenth aspects further comprises a motor configured to generate rotational force. The second member includes an accommodation space. The motor is at least partly provided in the accommodation space.

With the bicycle derailleur according to the twentieth aspect, it is possible to arrange the charging port to the second member including the accommodation space in which the motor is at least partly provided.

In accordance with a twenty-first aspect of the embodiments, the bicycle derailleur according to any one of the sixteenth to twentieth aspects is configured so that the derailleur body includes a third member which is a separate member from the second member. The second member is at least partly covered by the first member and the third member.

With the bicycle derailleur according to the twenty-first aspect, it is possible to couple the second member to the first member and the third member with a simple structure.

In accordance with a twenty-second aspect of the embodiments, the bicycle derailleur according to any one of the sixteenth to twenty-first aspects is configured so that the derailleur body includes a base member and a movable member configured to be movably coupled to the base member. One of the base member and the movable member includes the first member.

With the bicycle derailleur according to the twenty-second aspect, it is possible to couple the cover connector to the derailleur body using at least one of the base member and the movable member.

In accordance with a twenty-third aspect of the embodiments, a bicycle derailleur comprises an electric terminal, a component body, and a terminal protector. The electric terminal is made of a first conductive material. The electric terminal includes a terminal surface configured to be contactable with an external electric terminal to receive electric power from the external electric terminal. The component body includes a conductive part made of a second conductive material. The terminal protector is made of a third conductive material. The terminal protector is a separate member from the component body and includes a contact part and a protector body. The contact part is configured to be contactable with the conductive part of the component body. The protector body is spaced apart from the electric terminal and provided closer to the terminal surface than the contact part.

With the bicycle derailleur according to the twenty-third aspect, it is possible to protect the terminal surface of the electric terminal using the terminal protector.

In accordance with a twenty-fourth aspect of the embodiments, the bicycle derailleur according to the twenty-third aspect further comprises a motor unit having an accommodation space. The electric terminal is provided to at least one of the component body and the motor unit.

With the bicycle derailleur according to the twenty-fourth aspect, it is possible to arrange the electric terminal to at least one of the component body and the motor unit.

In accordance with a twenty-fifth aspect of the embodiments, the bicycle derailleur according to the twenty-fourth aspect is configured so that the motor unit is at least partially covered by the component body.

With the bicycle derailleur according to the twenty-fifth aspect, it is possible to protect the motor unit using the component body.

In accordance with a twenty-sixth aspect of the embodiments, the bicycle derailleur according to the twenty-fourth or twenty-fifth aspect is configured so that the motor unit includes a housing, a motor, a circuit board, and a gear structure. The housing has the accommodation space. The motor is at least partly provided in the accommodation space. The circuit board is at least partly provided in the accommodation space. The gear structure is at least partly provided in the accommodation space.

With the bicycle derailleur according to the twenty-sixth aspect, it is possible to arrange the motor, the circuit board, and the gear structure in the same space.

In accordance with a twenty-seventh aspect of the embodiments, the bicycle derailleur according to the twenty-sixth aspect is configured so that the contact part is configured to be contactable with the housing.

With the bicycle derailleur according to the twenty-seventh aspect, it is possible to ground the contact part using the housing of the motor unit.

In accordance with a twenty-eighth aspect of the embodiments, the bicycle derailleur according to any one of the twenty-third to twenty-seventh aspects is configured so that the terminal protector is provided to avoid overlapping with the terminal surface as viewed in a perpendicular direction perpendicular to the terminal surface.

With the bicycle derailleur according to the twenty-eighth aspect, it is possible to easily connect the external electric terminal to the terminal surface while protecting the terminal surface using the terminal protector.

In accordance with a twenty-ninth aspect of the embodiments, the bicycle derailleur according to any one of the twenty-third to twenty-eighth aspects further comprises an electric connecting portion configured to be electrically connected to an electric power source.

With the bicycle derailleur according to the twenty-ninth aspect, it is possible to electrically connect the derailleur body to the electric power source through the electric connecting portion.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
a derailleur body including:
    a base member,
    a movable member configured to be movably coupled to the base member, and
    a linkage structure movably coupling the movable member to the base member, the linkage structure including a link pin pivotally coupling a portion of the linkage structure to the base member;
a charging port configured to be detachably coupled to a charging cable to charge an electric power source; and
a circuit board being provided to the bicycle derailleur;
the charging port including an electric terminal;
the electric terminal including a plurality of electric contact surfaces being disposed along a first longitudinal direction of the charging port;
a direction of extension of the link pin being non-parallel to the first longitudinal direction; and
the circuit board being arranged to be closer to the link pin than the charging port is to the link pin.

2. The bicycle derailleur according to claim 1, wherein the plurality of electric contact surfaces is linearly aligned in a row in the first longitudinal direction.

3. The bicycle derailleur according to claim 1, wherein the plurality of electric contact surfaces includes a first electric contact surface and a second electric contact surface.

4. The bicycle derailleur according to claim 3, wherein the first electric contact surface is spaced from the second electric contact surface in the first longitudinal direction.

5. The bicycle derailleur according to claim 1, wherein the charging cable includes a connector, and
the electric terminal is configured to be contactable with an external electric terminal of the connector to receive electric power from the external electric terminal.

6. The bicycle derailleur according to claim 1, wherein the derailleur body includes a motor unit having an accommodation space, wherein
the electric terminal is provided to at least one of the derailleur body and the motor unit.

7. The bicycle derailleur according to claim 6, wherein the motor unit includes
    a motor at least partly provided in the accommodation space, and
    the circuit board at least partly provided in the accommodation space.

8. The bicycle derailleur according to claim 7, wherein the electric terminal is electrically connected to the circuit board.

9. The bicycle derailleur according to claim 1, wherein the derailleur body includes a motor unit, and
the motor unit is configured to be coupled to at least one of the movable member and the linkage structure to move the movable member relative to the base member.

10. The bicycle derailleur according to claim 9, wherein the charging port is provided to the base member.

11. The bicycle derailleur according to claim 1, wherein the electric power source is configured to be mounted to a bicycle frame.

12. The bicycle derailleur according to claim 1, wherein the electric power source is disposed remotely from the bicycle derailleur.

13. The bicycle derailleur according to claim 1, wherein the plurality of electric contact surfaces are each planar in shape.

14. The bicycle derailleur according to claim 1, wherein the first longitudinal direction is a longitudinal direction of the charging port.

15. The bicycle derailleur according to claim 1, wherein electric contact surfaces of the plurality of electric contact surfaces are planar contact surfaces that extend in a same plane.

16. The bicycle derailleur according to claim 15, wherein the first longitudinal direction extends within the same plane.

17. A bicycle derailleur comprising:
a derailleur body including:
    a base member,
    a movable member configured to be movably coupled to the base member, and
    a linkage structure movably coupling the movable member to the base member, the linkage structure including a link pin pivotally coupling a portion of the linkage structure to the base member;
a charging port configured to be detachably coupled to a charging cable to charge an electric power source; and
a terminal protector made of a conductive material;
the charging port including an electric terminal;
the electric terminal including a plurality of electric contact surfaces being disposed along a first longitudinal direction of the charging port;
a direction of extension of the link pin being non-parallel to the first longitudinal direction; and
the terminal protector includes a protector body that extends along a surface of the charging port adjacent to the plurality of electric contact surfaces of the electric terminal.

18. The bicycle derailleur according to claim 17, wherein electric contact surfaces of the plurality of electric contact surfaces are planar contact surfaces that extend in a same plane.

19. The bicycle derailleur according to claim 18, wherein the first longitudinal direction extends within the same plane.

20. The bicycle derailleur according to claim 17, further comprising:
a housing, wherein
the charging port is provided to the housing.

* * * * *